United States Patent
LaBosco et al.

(10) Patent No.: US 9,462,308 B2
(45) Date of Patent: Oct. 4, 2016

(54) AUDIOVISUAL DISTRIBUTION NETWORK

(71) Applicant: Crestron Electronics, Inc., Rockleigh, NJ (US)

(72) Inventors: Mark LaBosco, New City, NY (US); Manish Talreja, River Edge, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 14/517,494

(22) Filed: Oct. 17, 2014

(65) Prior Publication Data

US 2015/0135209 A1    May 14, 2015

Related U.S. Application Data

(60) Provisional application No. 61/892,073, filed on Oct. 17, 2013.

(51) Int. Cl.

| | |
|---|---|
| *H04N 7/173* | (2011.01) |
| *H04N 21/2347* | (2011.01) |
| *H04N 21/436* | (2011.01) |
| *H04N 21/643* | (2011.01) |
| *H04N 21/6405* | (2011.01) |
| *H04N 21/4363* | (2011.01) |
| *H04N 21/4367* | (2011.01) |
| *H04L 12/18* | (2006.01) |

(52) U.S. Cl.
CPC ...... *H04N 21/2347* (2013.01); *H04L 12/1886* (2013.01); *H04N 21/4367* (2013.01); *H04N 21/43615* (2013.01); *H04N 21/43635* (2013.01); *H04N 21/6405* (2013.01); *H04N 21/64322* (2013.01)

(58) Field of Classification Search
CPC ................................................. H04N 21/43635
See application file for complete search history.

(56) References Cited

U.S. PATENT DOCUMENTS

| | | | |
|---|---|---|---|
| 6,590,902 B1 * | 7/2003 | Suzuki ........... | H04N 21/234327 348/384.1 |
| 7,992,177 B2 | 8/2011 | Perry | |
| 8,266,657 B2 | 9/2012 | Margulis | |
| 2009/0106806 A1 * | 4/2009 | Lee ..................... | H04N 7/17318 725/110 |
| 2009/0180614 A1 | 7/2009 | Rajagopal et al. | |
| 2010/0177892 A1 | 7/2010 | Choi | |
| 2011/0022739 A1 * | 1/2011 | Guillerm ................ | G09G 5/006 710/18 |
| 2011/0134330 A1 * | 6/2011 | Yu .......................... | H04N 5/268 348/705 |
| 2011/0191810 A1 * | 8/2011 | Thomas ................. | H04N 7/106 725/81 |
| 2011/0239262 A1 * | 9/2011 | Yang ................. | H04N 21/26616 725/109 |
| 2011/0274179 A1 * | 11/2011 | Holden ............ | H04N 21/23109 375/240.25 |
| 2013/0230296 A1 * | 9/2013 | Yun ....................... | G06F 21/606 386/230 |

OTHER PUBLICATIONS

Black Box Network Services, MediaCento IPX Extenders, Product Specification, 2012, Lawrence, PA USA.
Just Add Power, HD Over IP Specifications, 2012, Indian Rocks Beach, FL USA.
Just Add Power, HDMI Over IP Distribution, 2013, Indian Rocks Beach, FL USA.

* cited by examiner

*Primary Examiner* — Michael Hong
(74) *Attorney, Agent, or Firm* — Crestron Electronics Inc.

(57) ABSTRACT

An audiovisual (AV) distribution network communicates via Internet Protocol and is implemented as a framework of local area networks (LANs). Transmitters and receivers in the AV distribution network leverage multicast transmission technology and pre-authentication to switch quickly and seamlessly between sources transmitting audiovisual data protected by a security protocol scheme.

22 Claims, 23 Drawing Sheets

AUDIOVISUAL DISTRIBUTION NETWORK

BACKGROUND OF THE INVENTION

1. Technical Field

The present invention relates generally to Internet Protocol networks and more particularly to media distribution over an Internet Protocol network.

2. Background Art

Video distribution throughout a facility is often accomplished through an audiovisual distribution network. Audiovisual distribution networks are increasingly common installations in commercial and residential facilities. Components of an audiovisual distribution network are typically distributed throughout a facility and networked to allow video to be distributed from one or more AV sources 11 to one or more video sinks 15. For example, a corporate audiovisual distribution network may comprise multiple AV sources 11 such as media servers, personal computer devices, disc players such as digital video disc (DVD) player and Blu-ray disc® players and cable boxes distributed throughout a corporate campus.

Internet Protocol (IP) is a communication protocol that may be employed to transmit video throughout the audiovisual distribution network. An IP protocol audiovisual distribution network may be implemented as a local area network (LAN), a wide area network (WAN) or various combinations of the two.

In a LAN, a group of devices are connected together in a localized area to communicate with one another and share resources. Ethernet, the most widely employed LAN technology, is specified in Institute of Electrical and Electronics Engineers (IEEE) 802.3 standard. Other LAN networking technologies may include, for example, Token Ring and FDDI.

A WAN is a network that covers a broad area using private or public network transports. For example, any telecommunications network that links across metropolitan, regional or national boundaries is a WAN. It is common for the physical layer of these kinds of networks to be implemented with category (CAT) cable, coaxial cable, optical fiber or wireless transmission media.

Traditionally, to network several devices in a LAN, network equipment such as a network switch is required. A network switch is a computer networking device that links network segments or network devices by forwarding data from one device to another. Network switches have limited capacity and therefore the networks have limited bandwidth. Bandwidth limits may limit the amount or type of video distributed on an IP network.

Additionally, there may be applications where it is desirable to provide content or digital copy protection, such as High Bandwidth Digital Content Protection (HDCP), when transmitting over IP networks.

Accordingly, there is a need for an audiovisual distribution network which efficiently utilizes IP communication protocol and incorporates digital content protection.

SUMMARY OF THE INVENTION

It is to be understood that both the general and detailed descriptions that follow are exemplary and explanatory only and are not restrictive of the invention.

DISCLOSURE OF INVENTION

One object is to provide methods and systems for switching between media over audiovisual distribution network. The present invention may be generally practiced on a diversity of data streams and is particularly well suited for media streams such as video streams. Therefore, any reference to use of audiovisual data herein are provided by way of example and are not intended to limit the practice of the invention.

According to a first aspect, a system for distributing audiovisual data comprises at least two transmitters and a receiver. Each of the transmitters transmits security protocol encrypted audiovisual data as an Internet Protocol multicast stream. The receiver is configured for authenticating with a second audiovisual transmitter according to the security protocol while simultaneously receiving an Internet Protocol multicast stream from a first transmitter.

According to a second aspect, a method for a receiver in an audiovisual distribution network to switch sources includes the steps of receiving from a first audiovisual transmitter, a first Internet Protocol multicast stream comprising audiovisual data encrypted according to a security protocol; authenticating with a second audiovisual transmitter according to the security protocol prior to leaving the first Internet Protocol multicast stream; joining a second Internet Protocol multicast stream of the second audiovisual transmitter; leaving the first Internet Protocol multicast stream; and receiving the second Internet Protocol multicast stream from the second audiovisual transmitter.

The present invention seeks to overcome or at least ameliorate one or more of several problems, including but not limited to, quickly and/or seamlessly switching between different audiovisual multicasts over an audiovisual distribution network.

Additional aspects and advantages of the invention will be set forth in part in the description which follows and, in part, will be obvious from the description, or may be learned by practice of the invention.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWINGS

Figure 1:
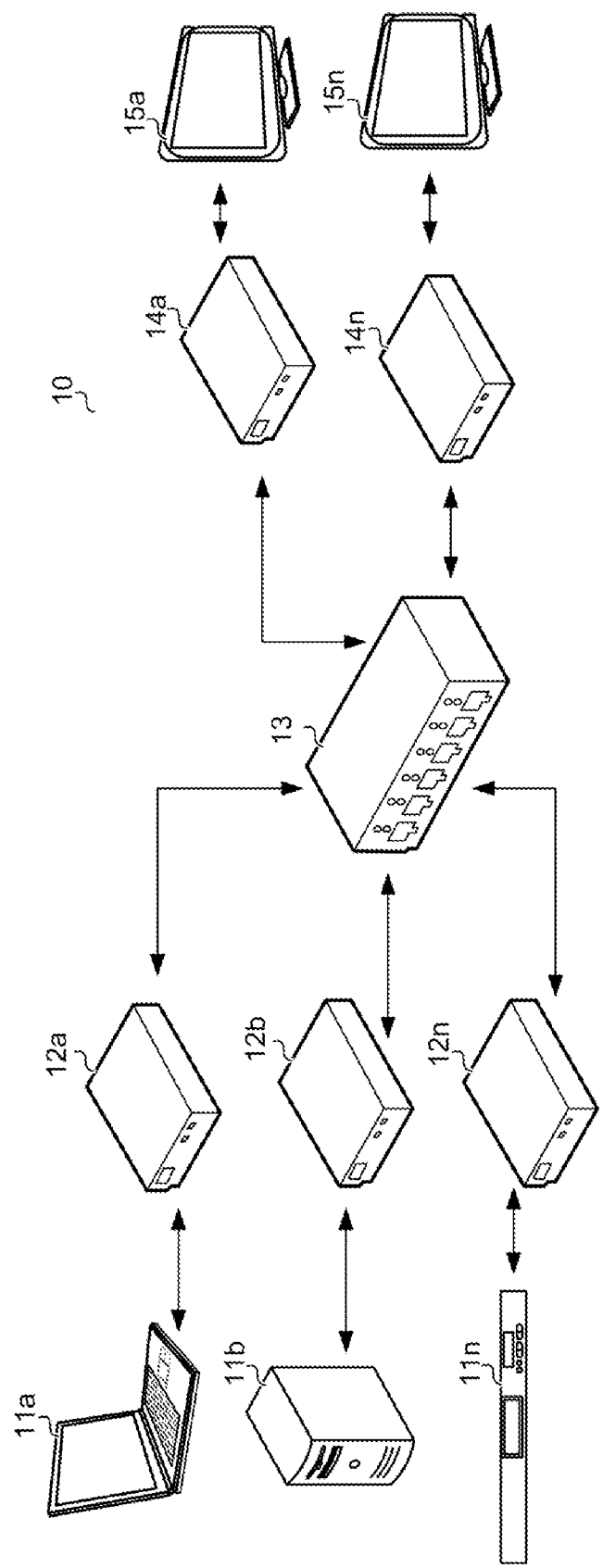

FIG. 1 shows an audiovisual distribution network, in accordance with one illustrative embodiment.

Figure 2:
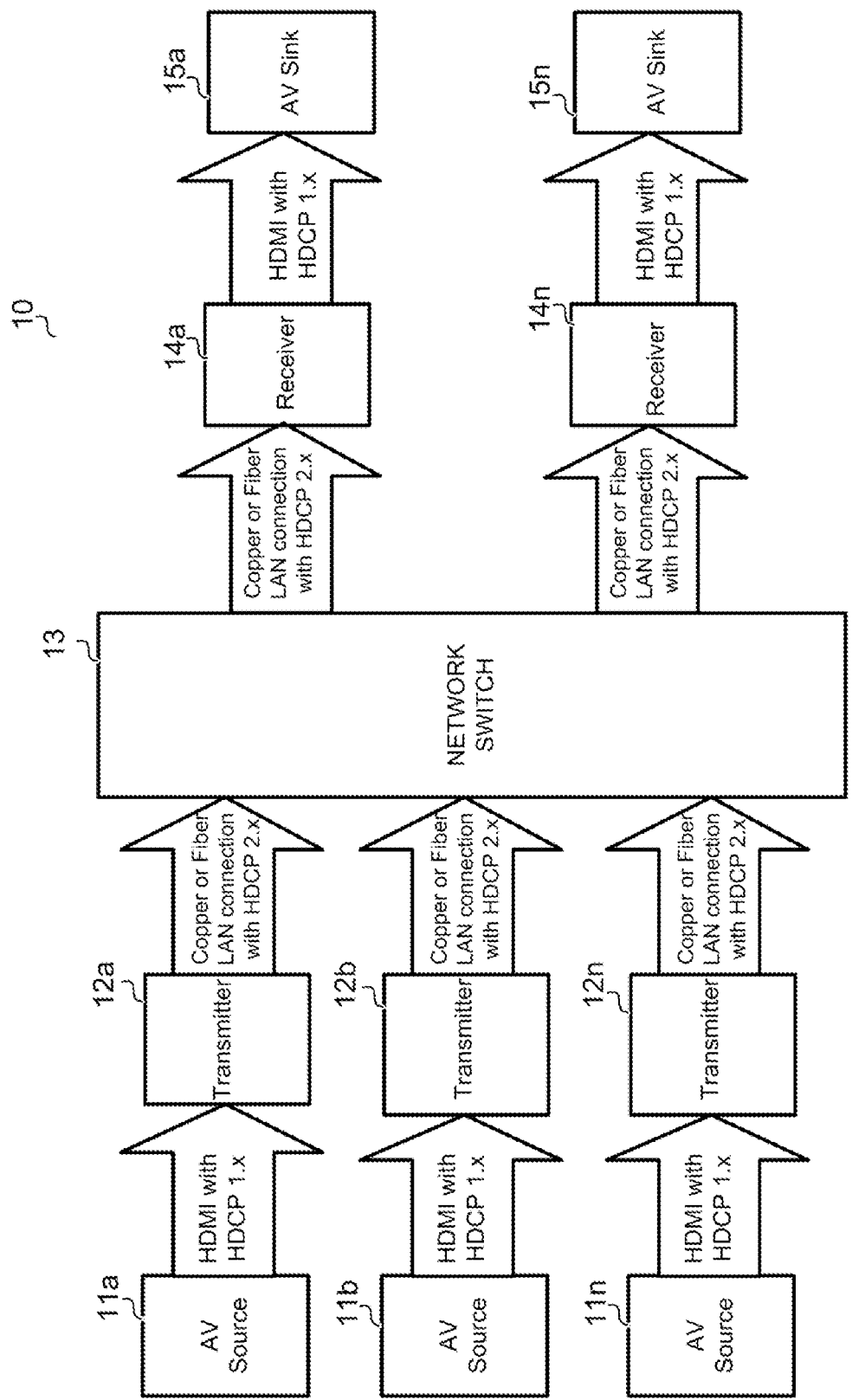

FIG. 2 is a block diagram of the audiovisual distribution network, in accordance with one illustrative embodiment.

Figure 3:
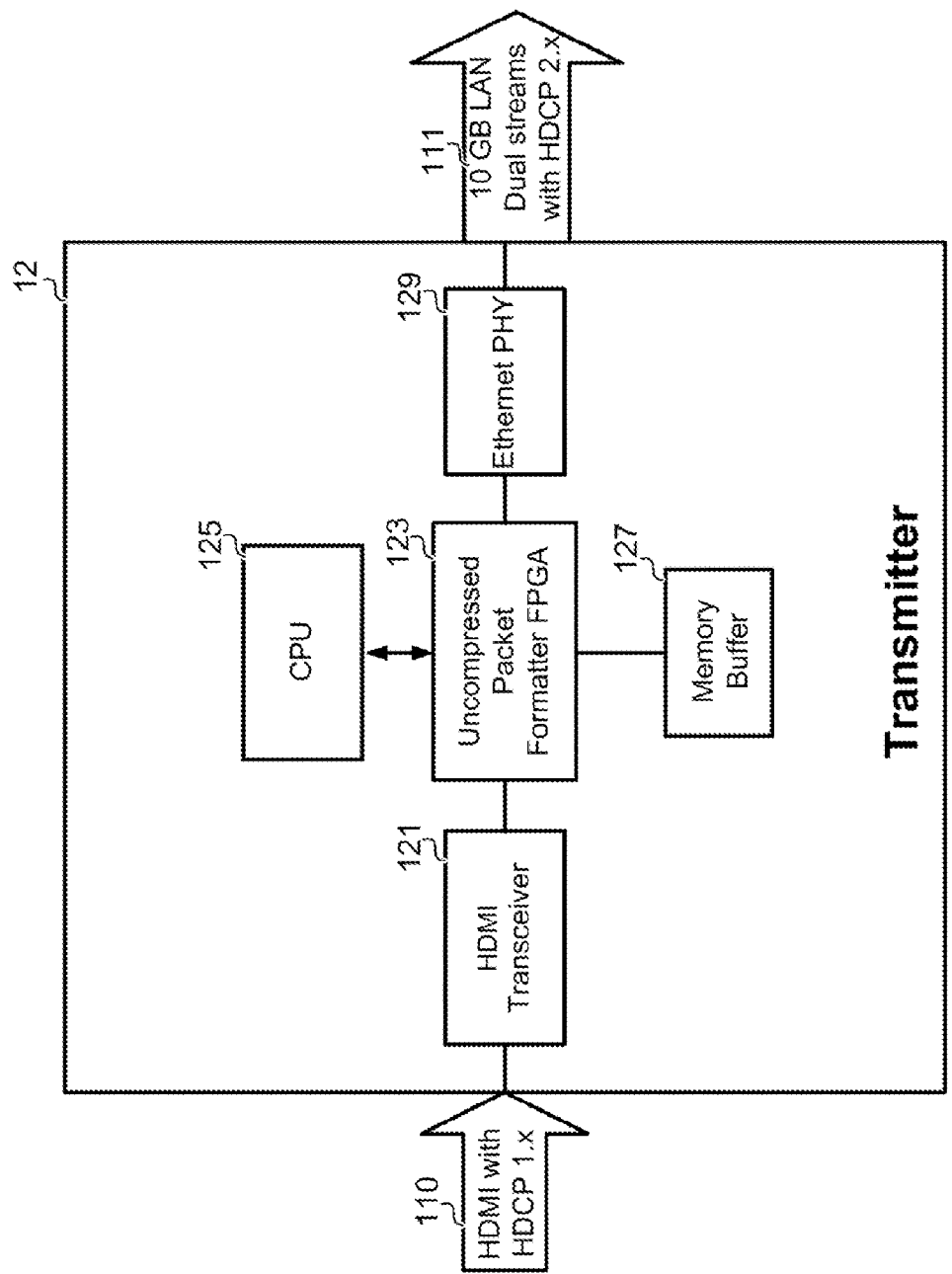

FIG. 3 is a block diagram of an intermediate transceiver device functioning as a transmitter, in accordance with one illustrative embodiment.

Figure 4:
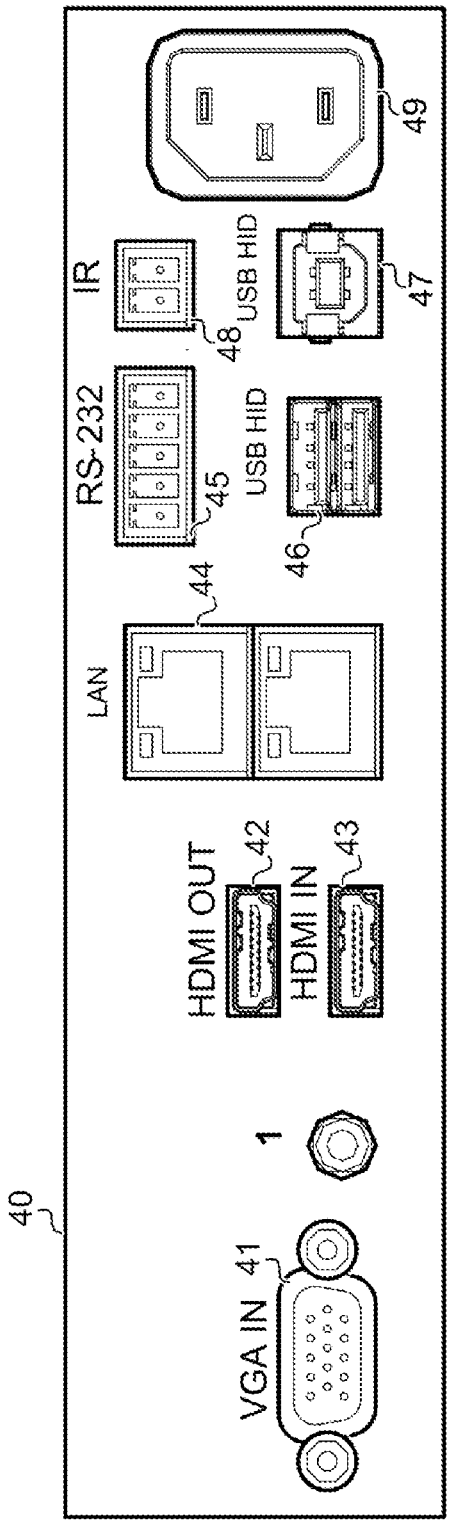

FIG. 4 shows the back panel of the intermediate transceiver device, in accordance with one illustrative embodiment.

Figure 5:
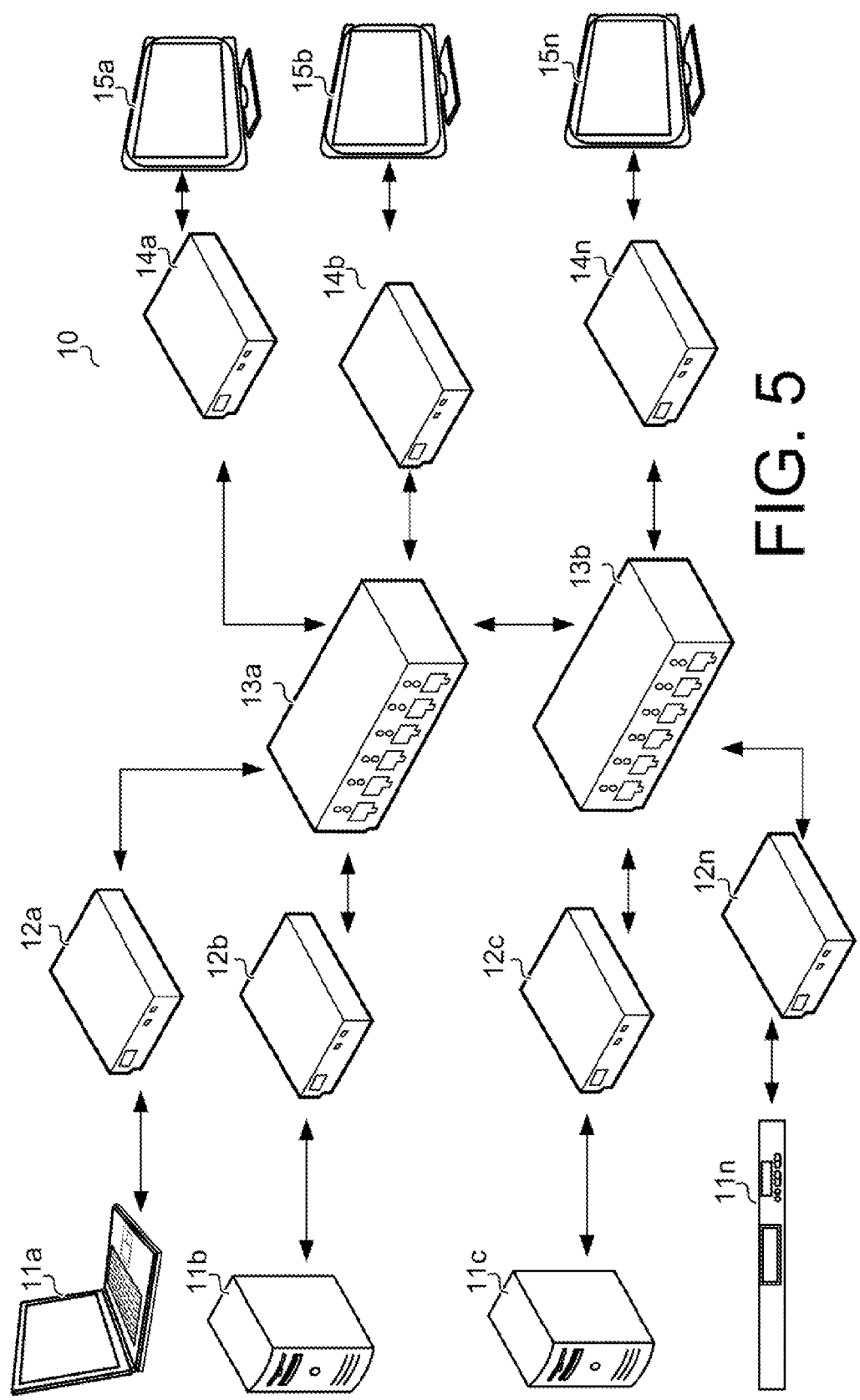

FIG. 5 shows an audiovisual distribution network comprising multiple network switches, in accordance with one illustrative embodiment.

Figure 6:
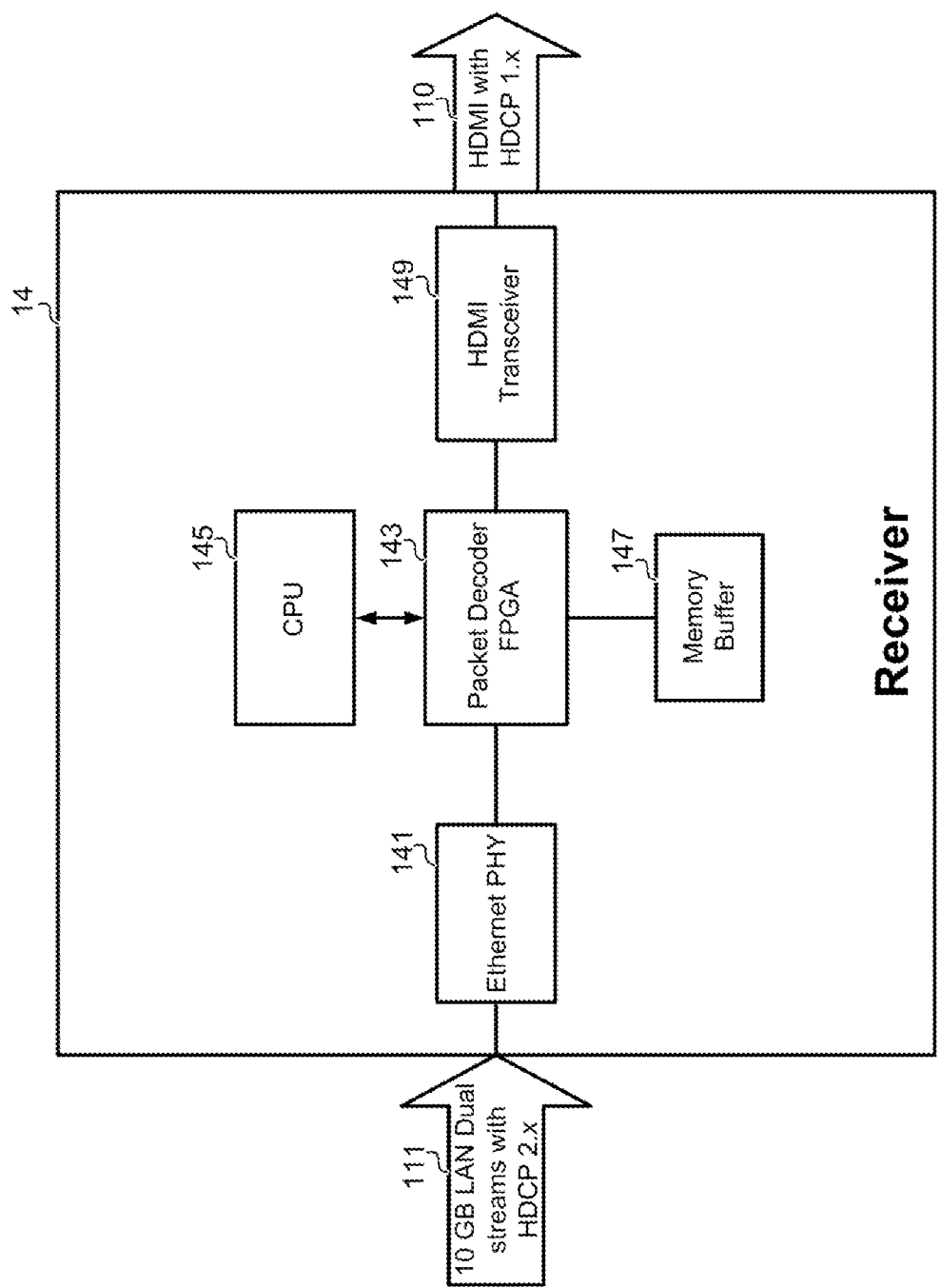

FIG. 6 is a block diagram of an intermediate transceiver device functioning as a receiver, in accordance with one illustrative embodiment.

Figure 7:
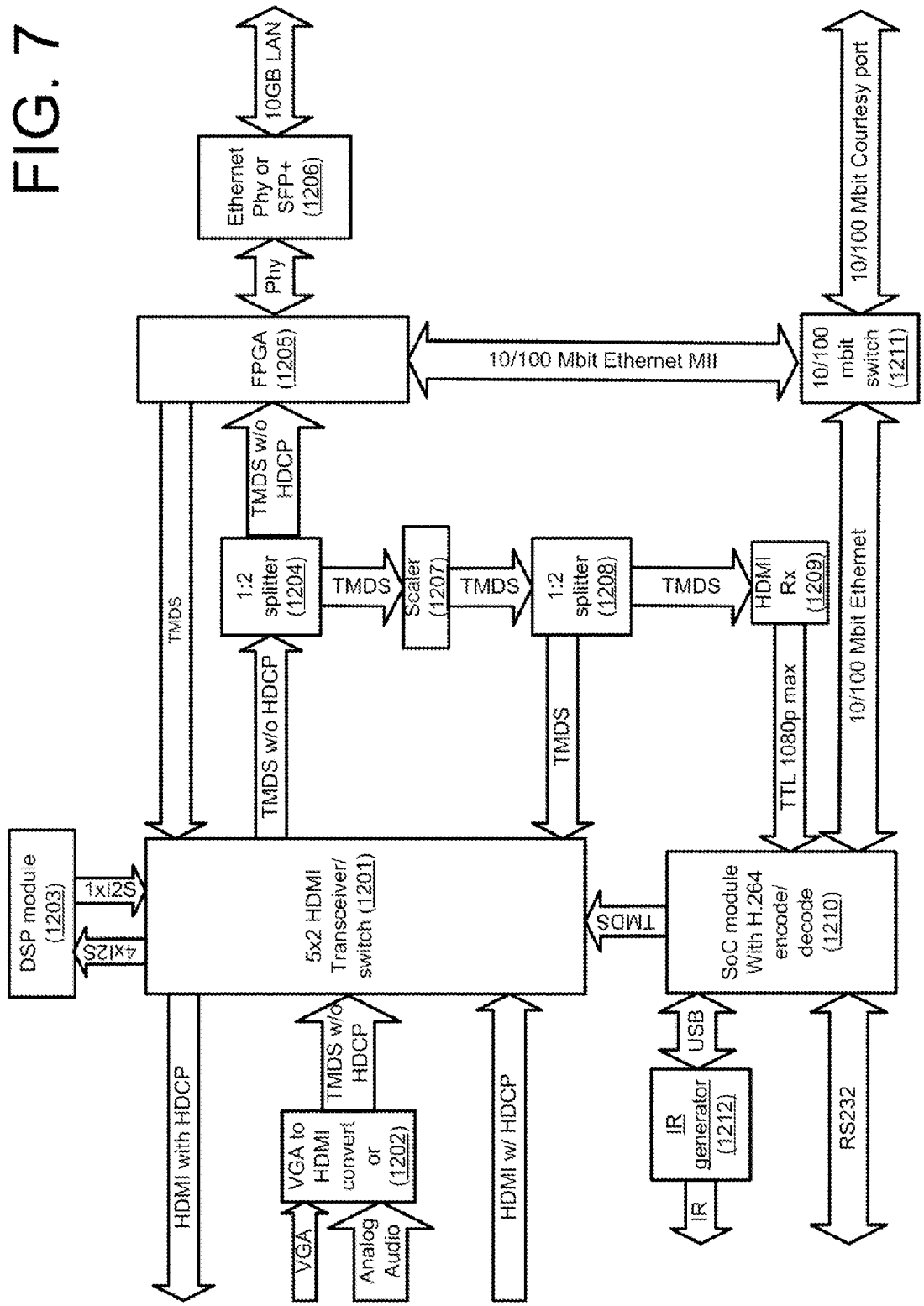

FIG. 7 is a block diagram of an intermediate transceiver device for use in an audiovisual distribution network, in accordance with one illustrative embodiment.

Figure 8:
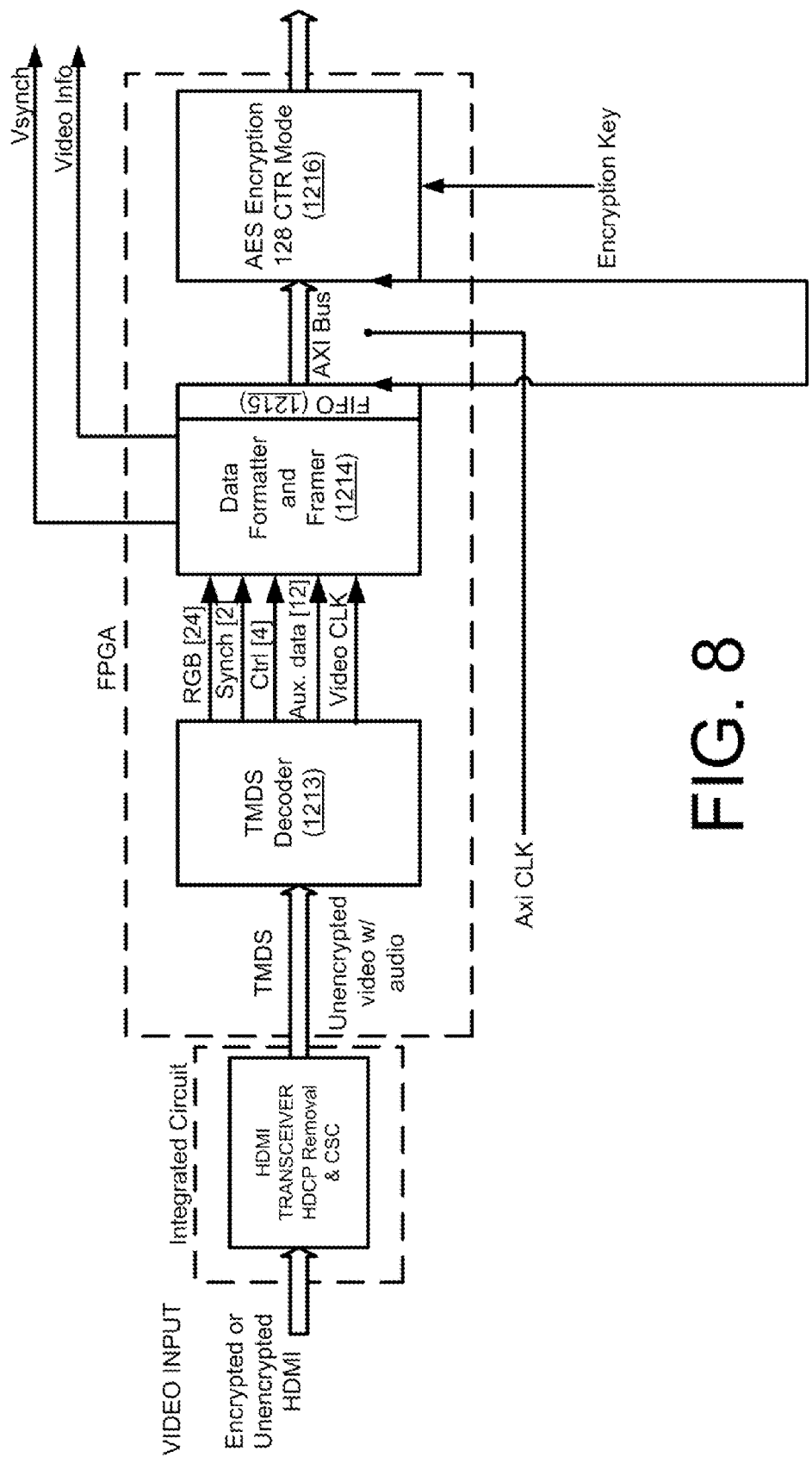

FIG. 8 is a block diagram illustrating the front end processing function of the audiovisual transmitter, in accordance with one illustrative embodiment.

Figure 9:
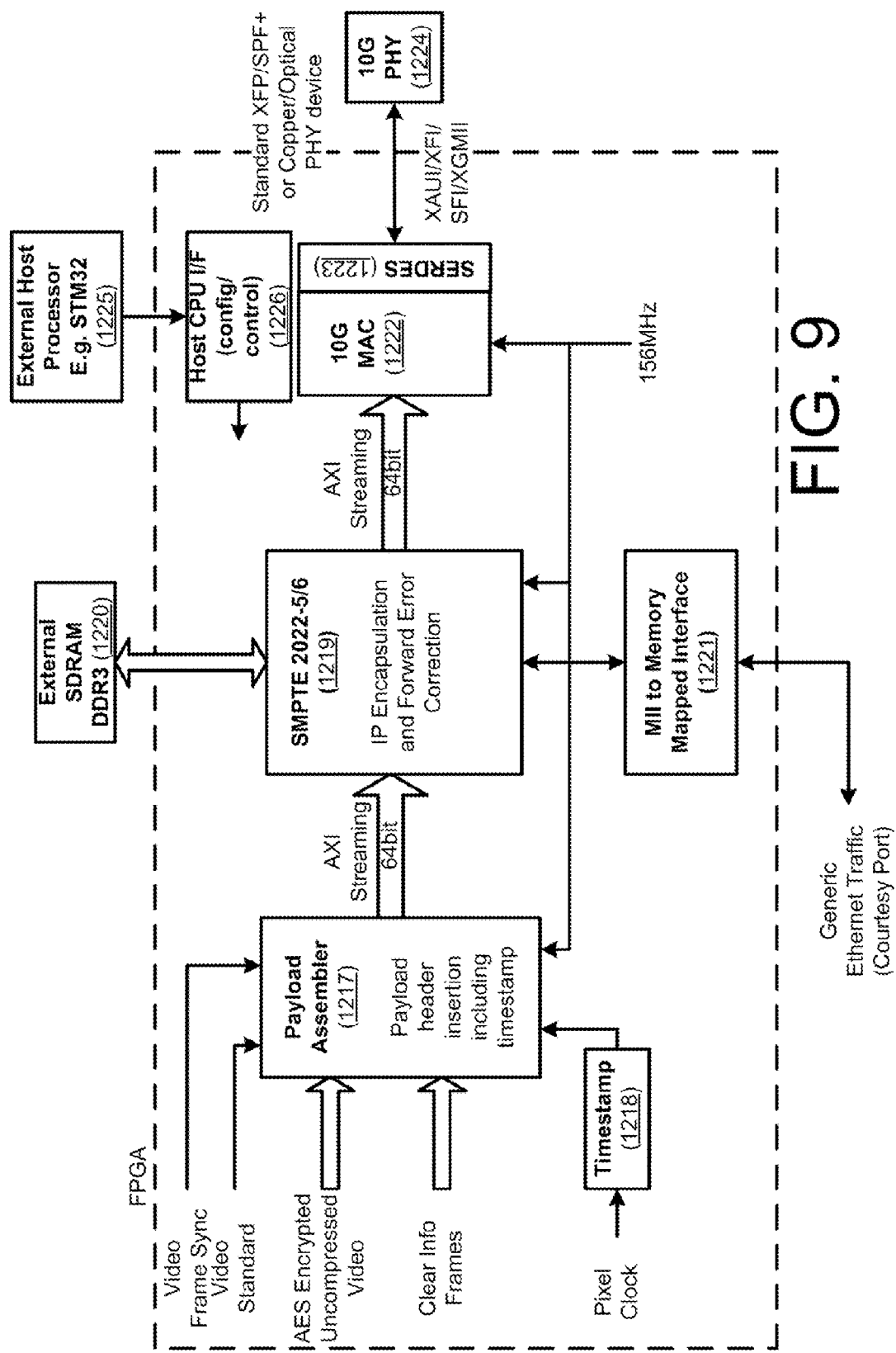

FIG. 9 is a block diagram illustrating the encapsulation function of the audiovisual transmitter, in accordance with one illustrative embodiment.

Figure 10:
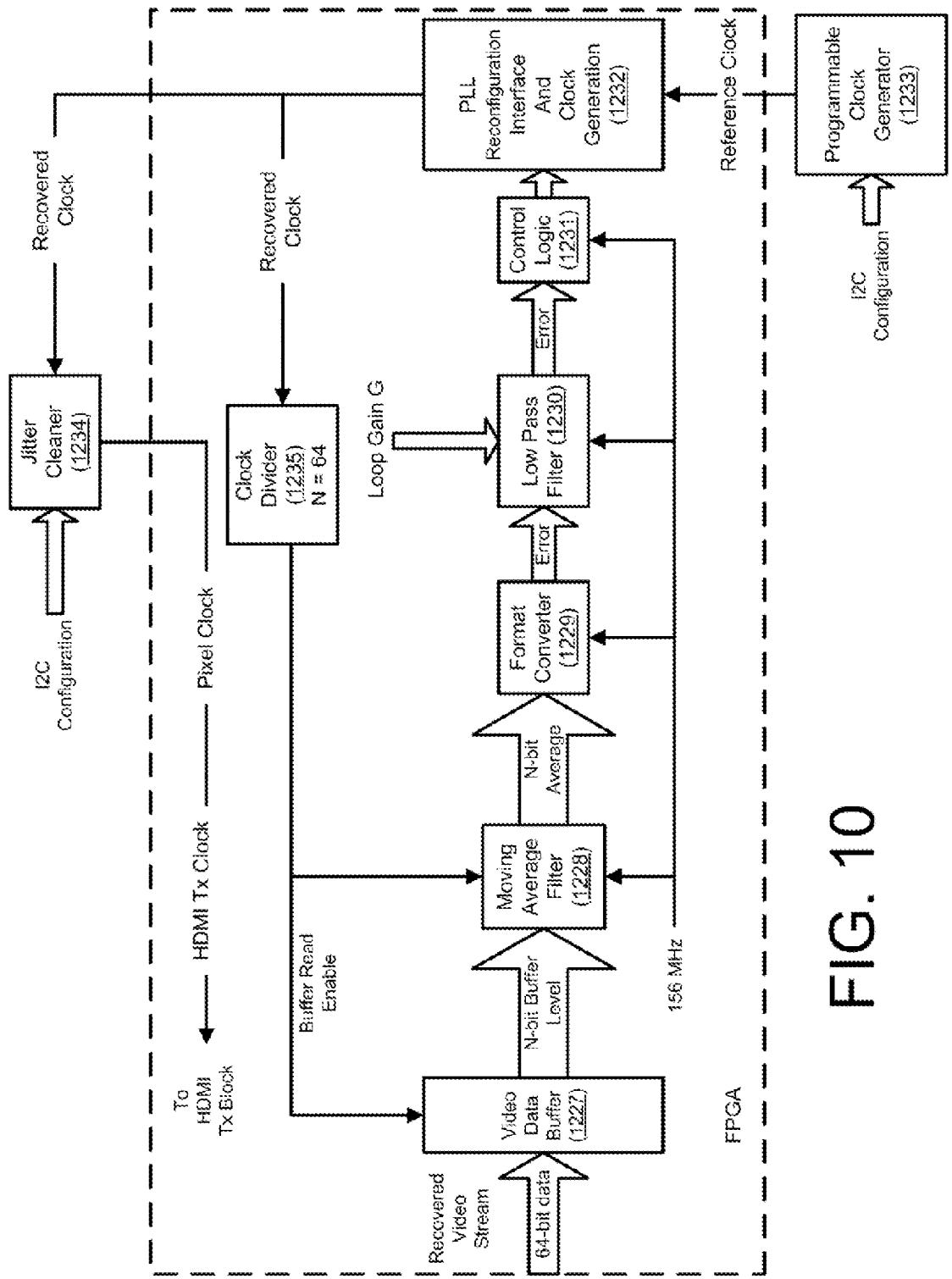

FIG. 10 is a block diagram illustrating the clock recovery function of the audiovisual receiver, in accordance with one illustrative embodiment.

Figure 11:
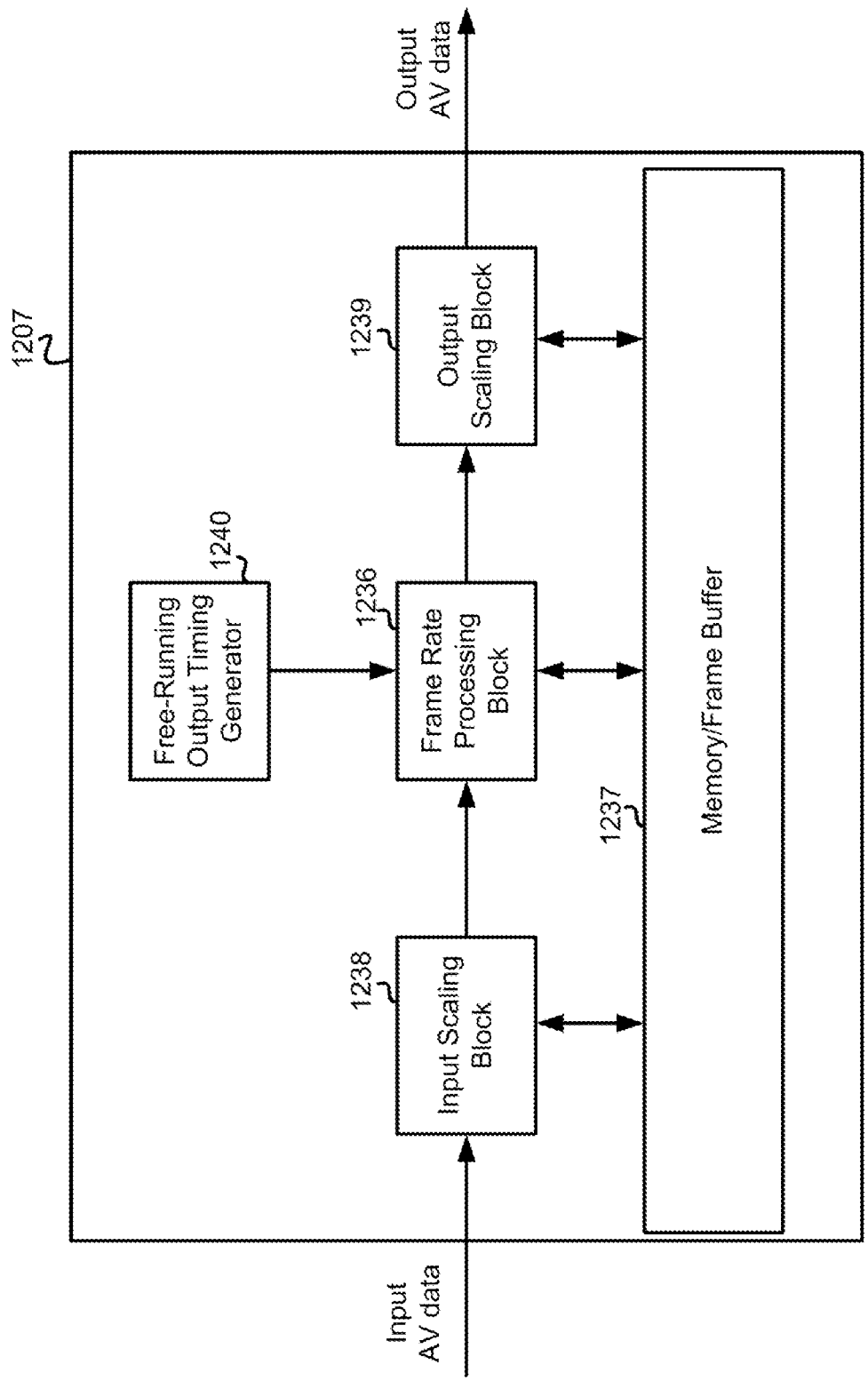

FIG. 11 is a block diagram of a scaler, in accordance with one illustrative embodiment of the invention.

Figure 12:
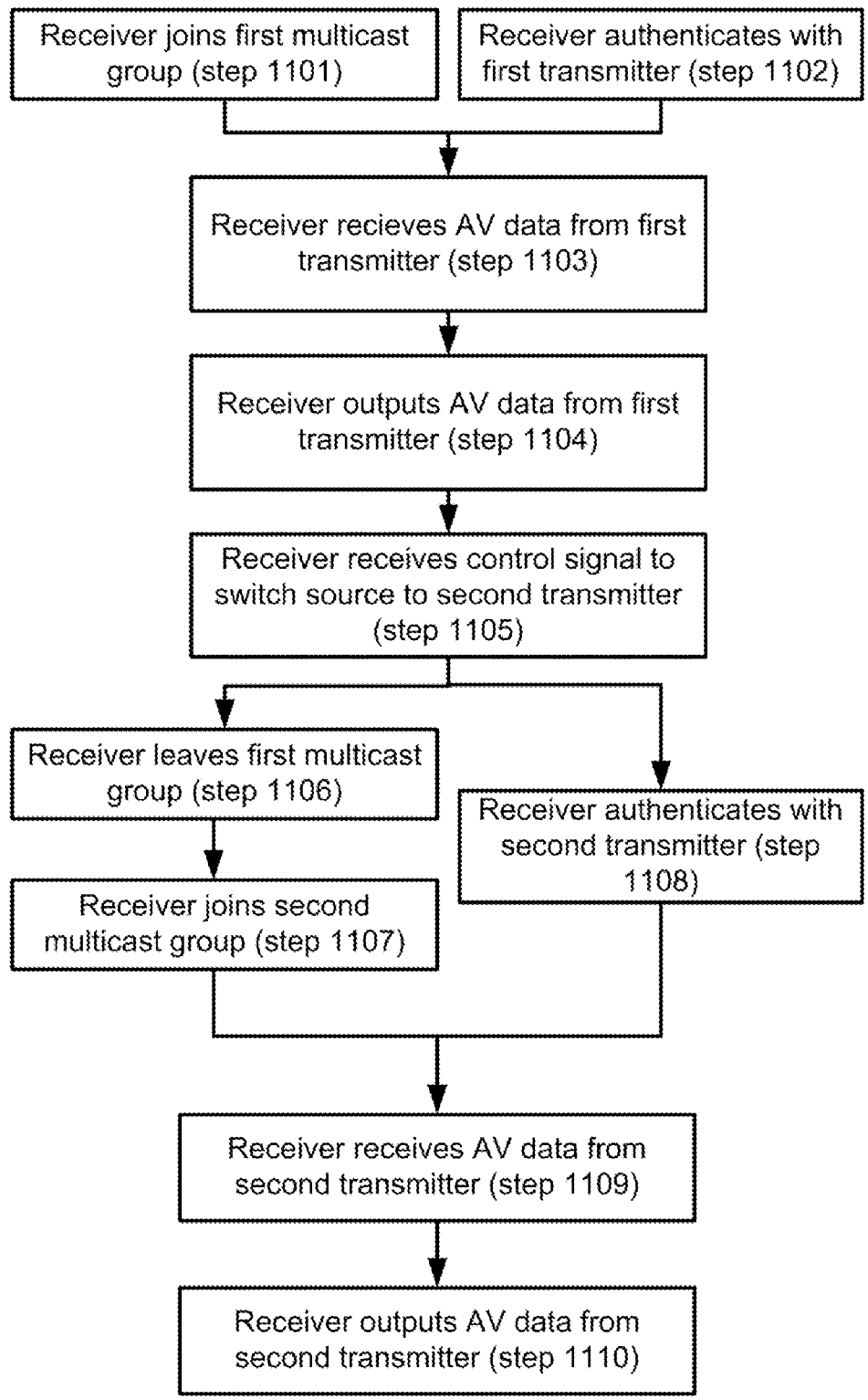

FIG. 12 is a flowchart detailing a method for switching AV sources in an AV distribution network, according to one illustrative embodiment.

Figure 13:
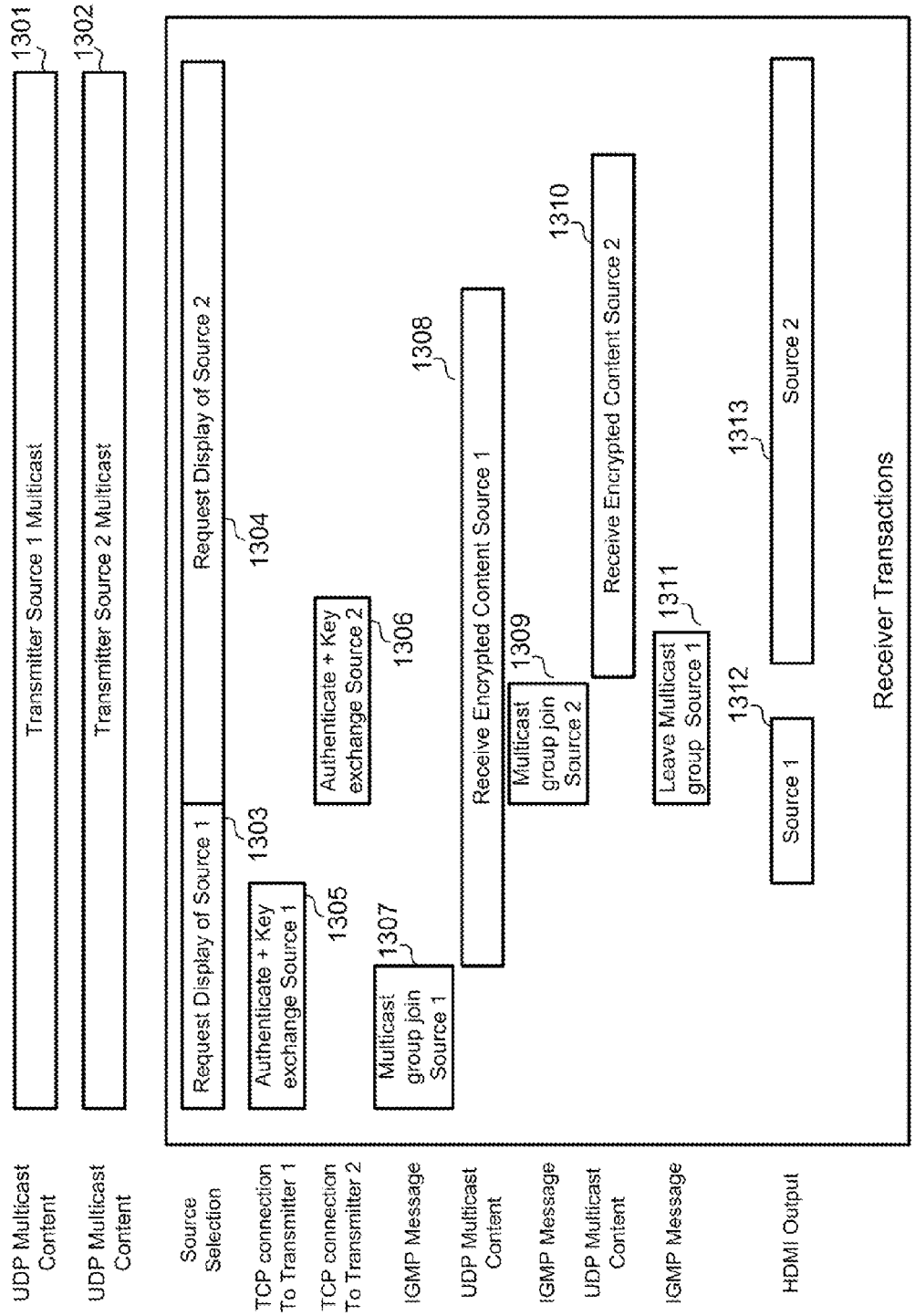

FIG. 13 is a transaction sequence illustrating receiver transactions on the AV distribution network, according to one illustrative embodiment.

Figure 14:
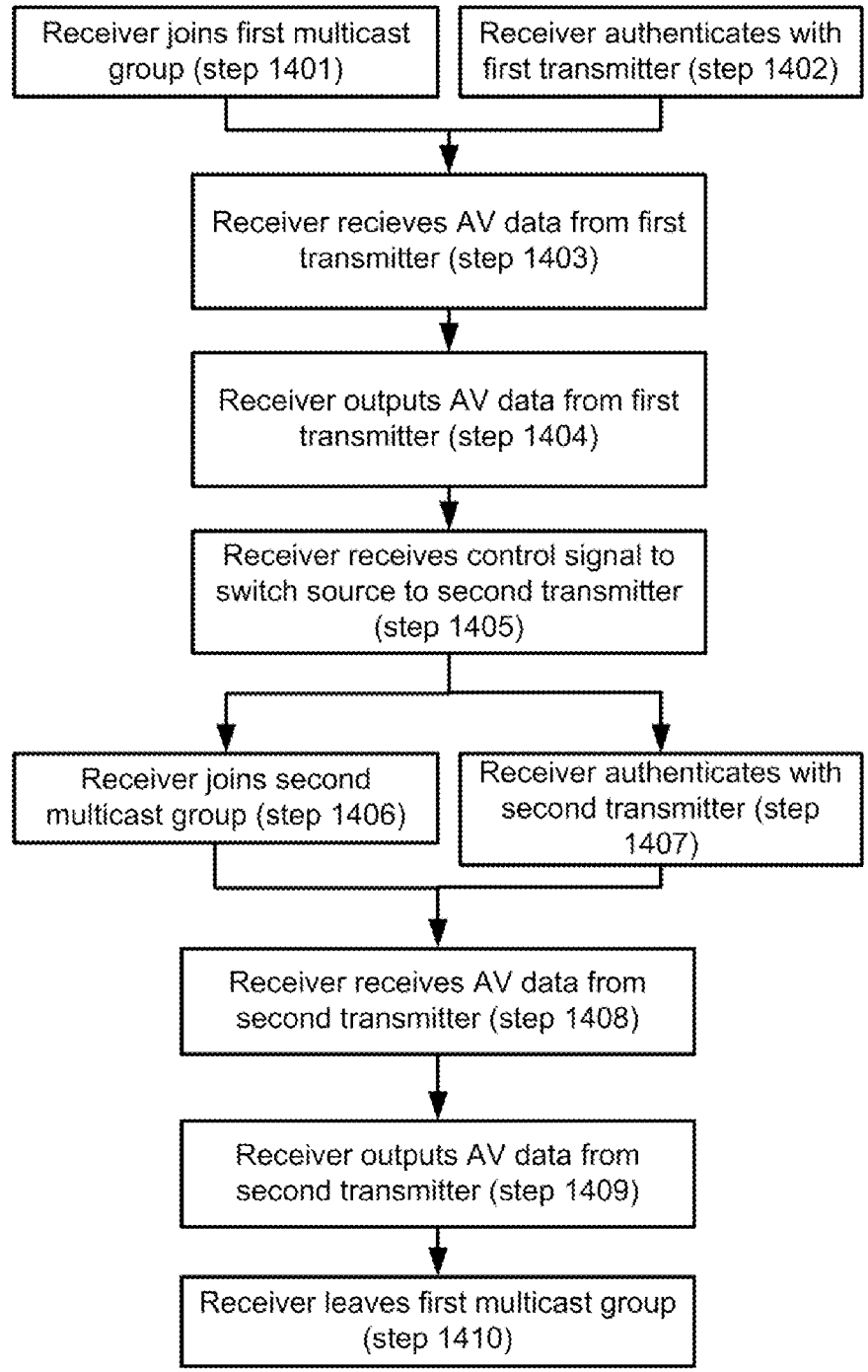

FIG. 14 is a flowchart detailing a method for switching AV sources in an AV distribution network, according to one illustrative embodiment.

Figure 15:
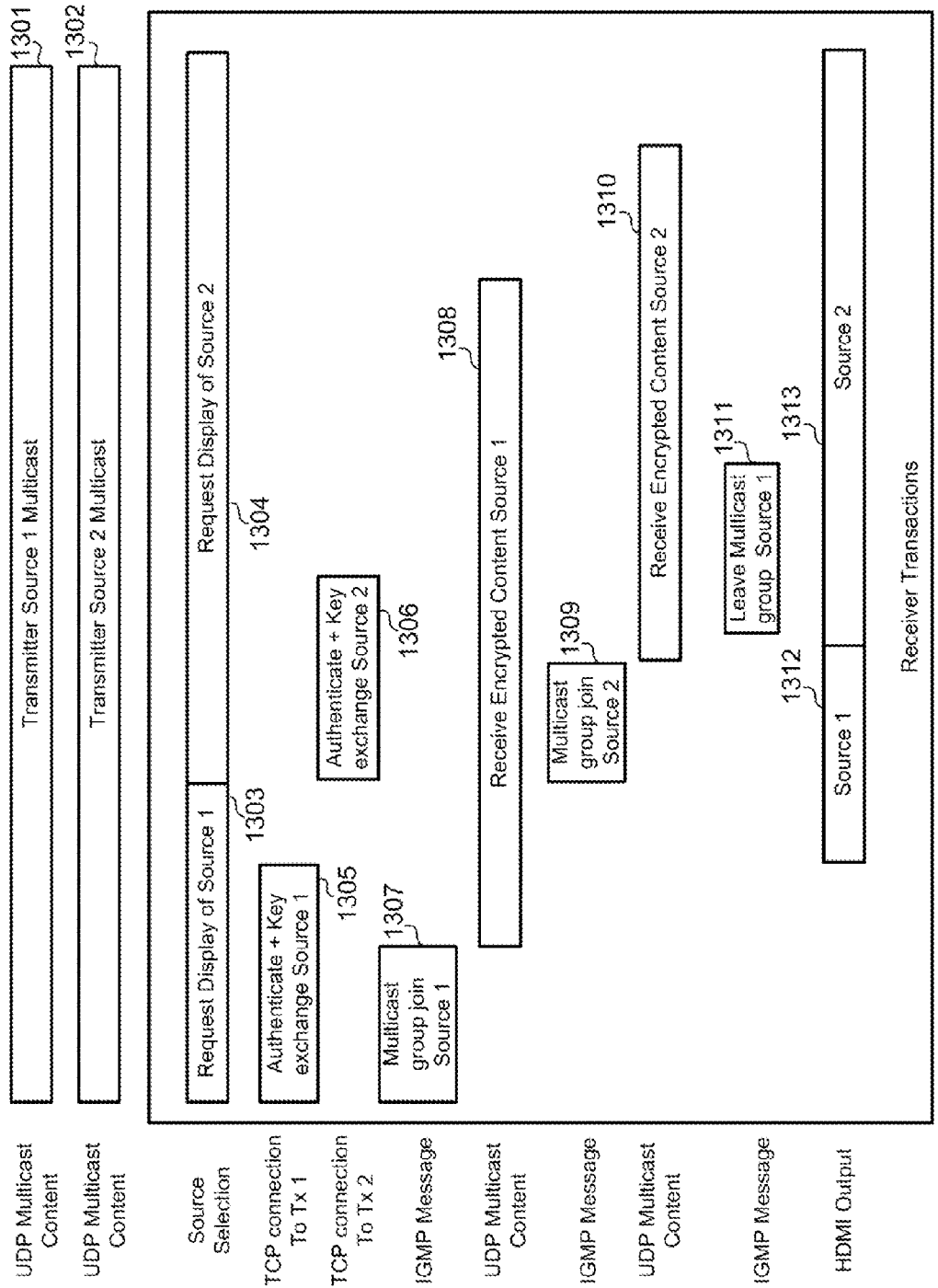

FIG. 15 is a transaction sequence illustrating receiver transactions on the AV distribution network, according to one illustrative embodiment.

Figure 16:
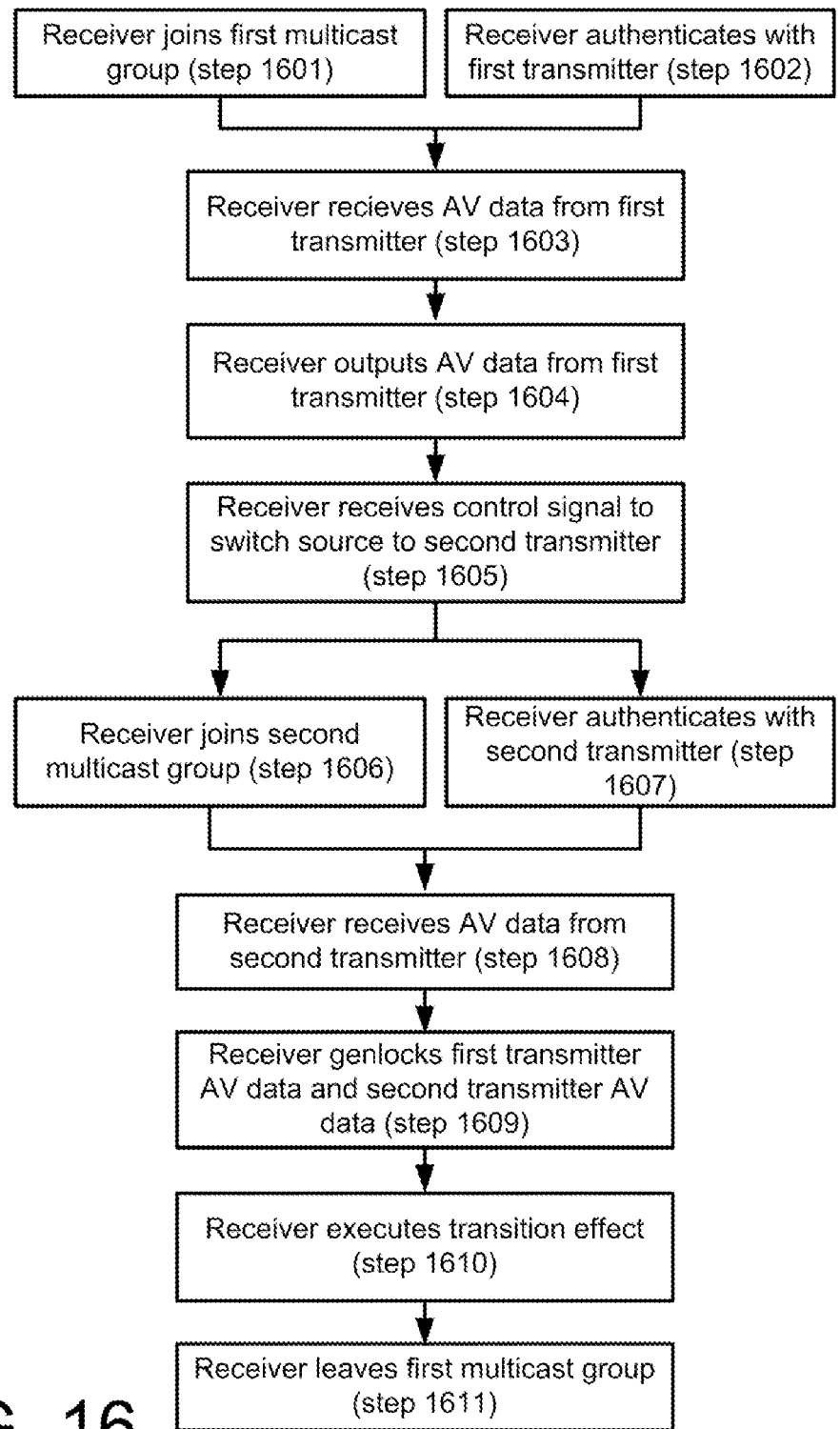

FIG. 16 is a flowchart illustrating a method for switching sources in an audiovisual distribution network, according to one illustrative embodiment.

Figure 17:
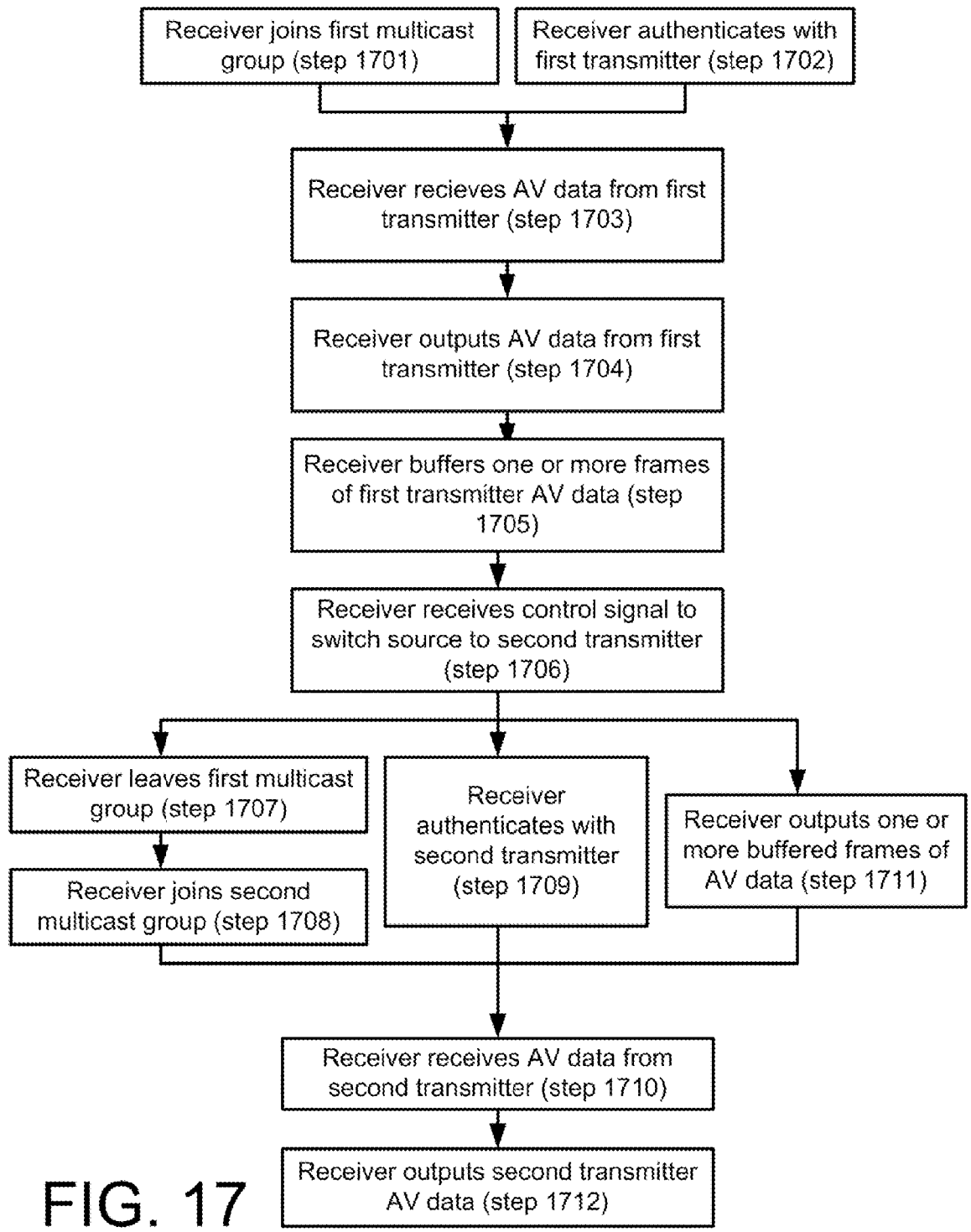

FIG. 17 is a flowchart detailing a method for switching AV sources in an AV distribution network, according to one illustrative embodiment.

Figure 18:
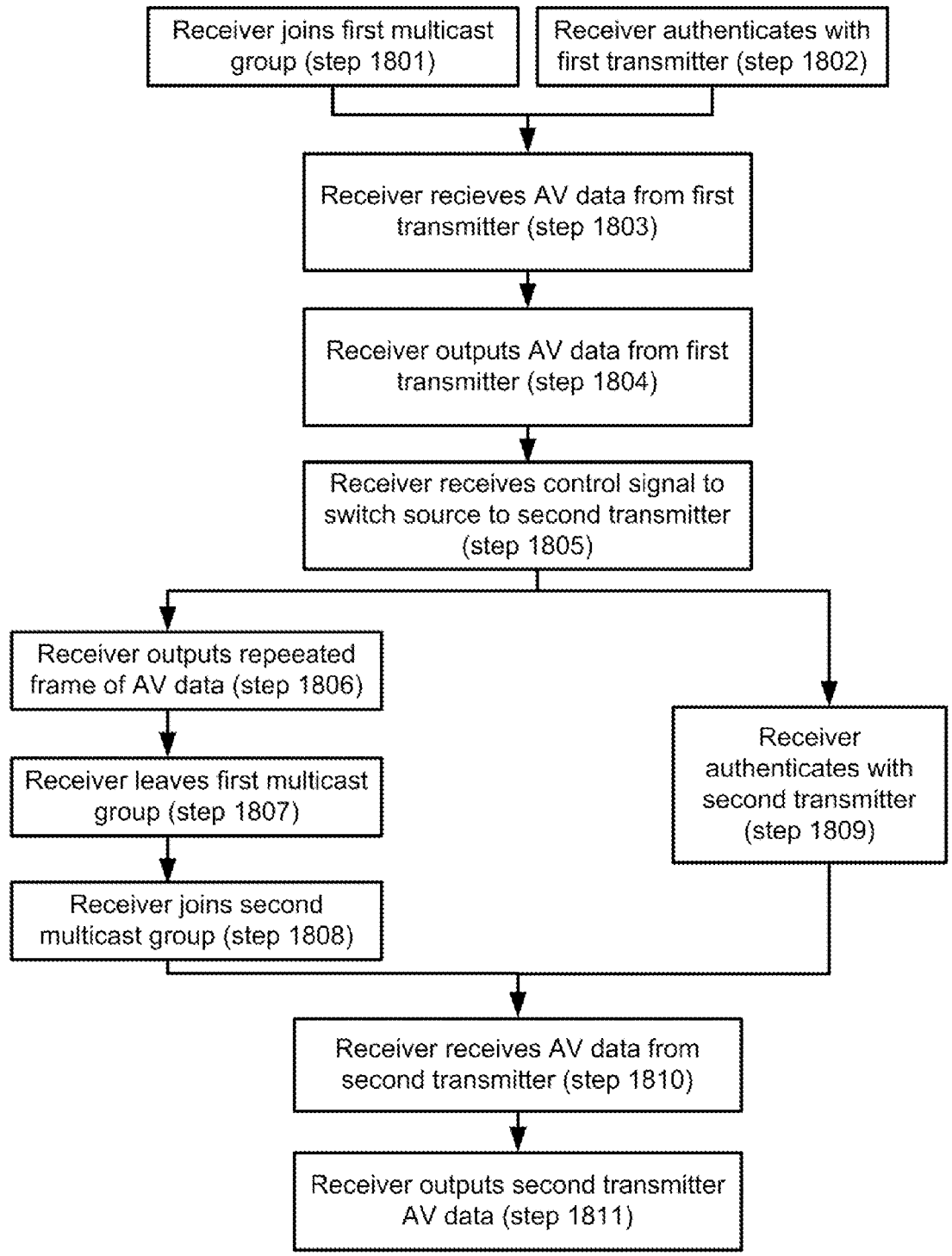

FIG. 18 is a transaction sequence illustrating receiver transactions on the AV distribution network, according to one illustrative embodiment.

Figure 19:
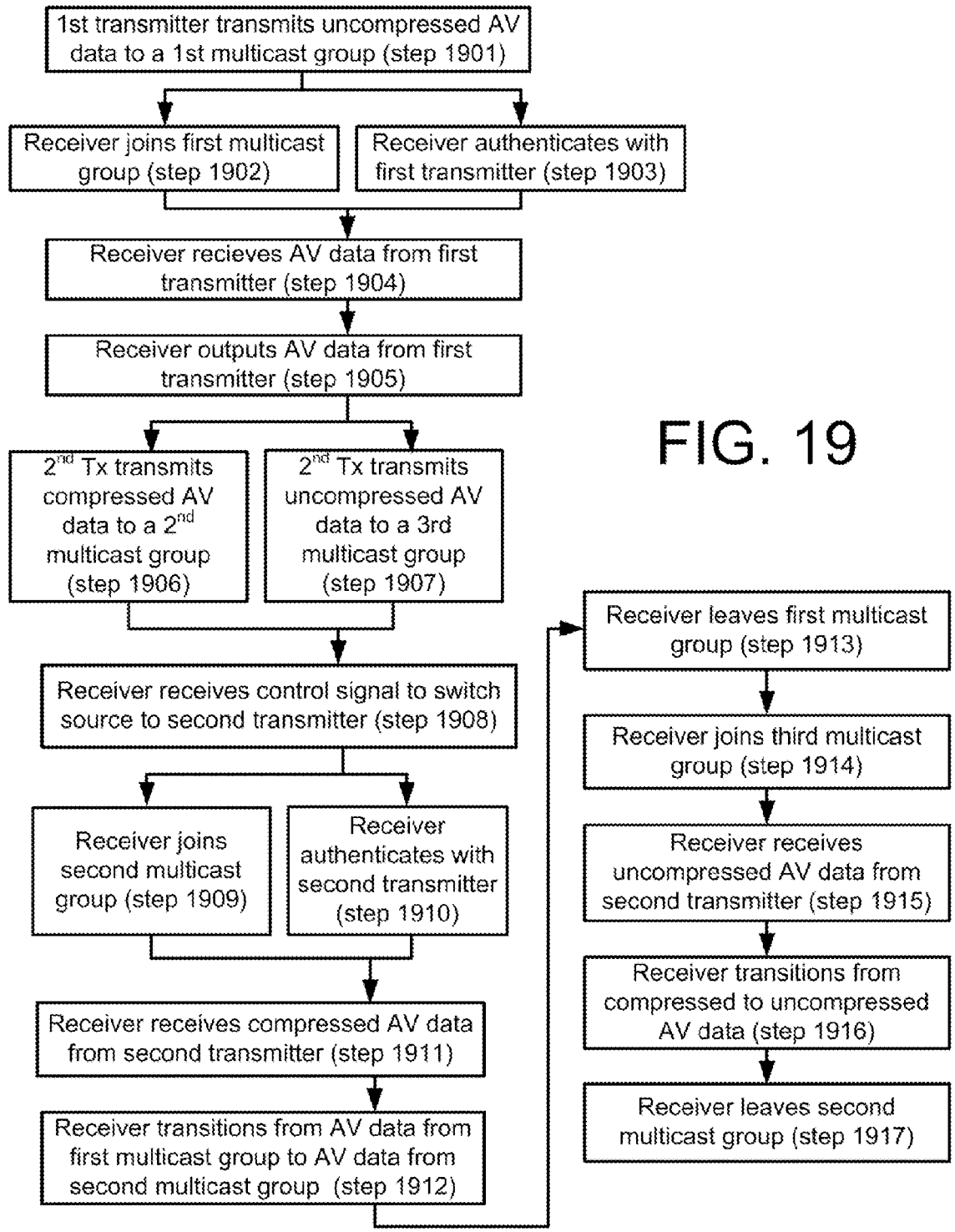

FIG. 19 is a flowchart detailing a method for switching AV sources in an AV distribution network, according to one illustrative embodiment.

Figure 20:
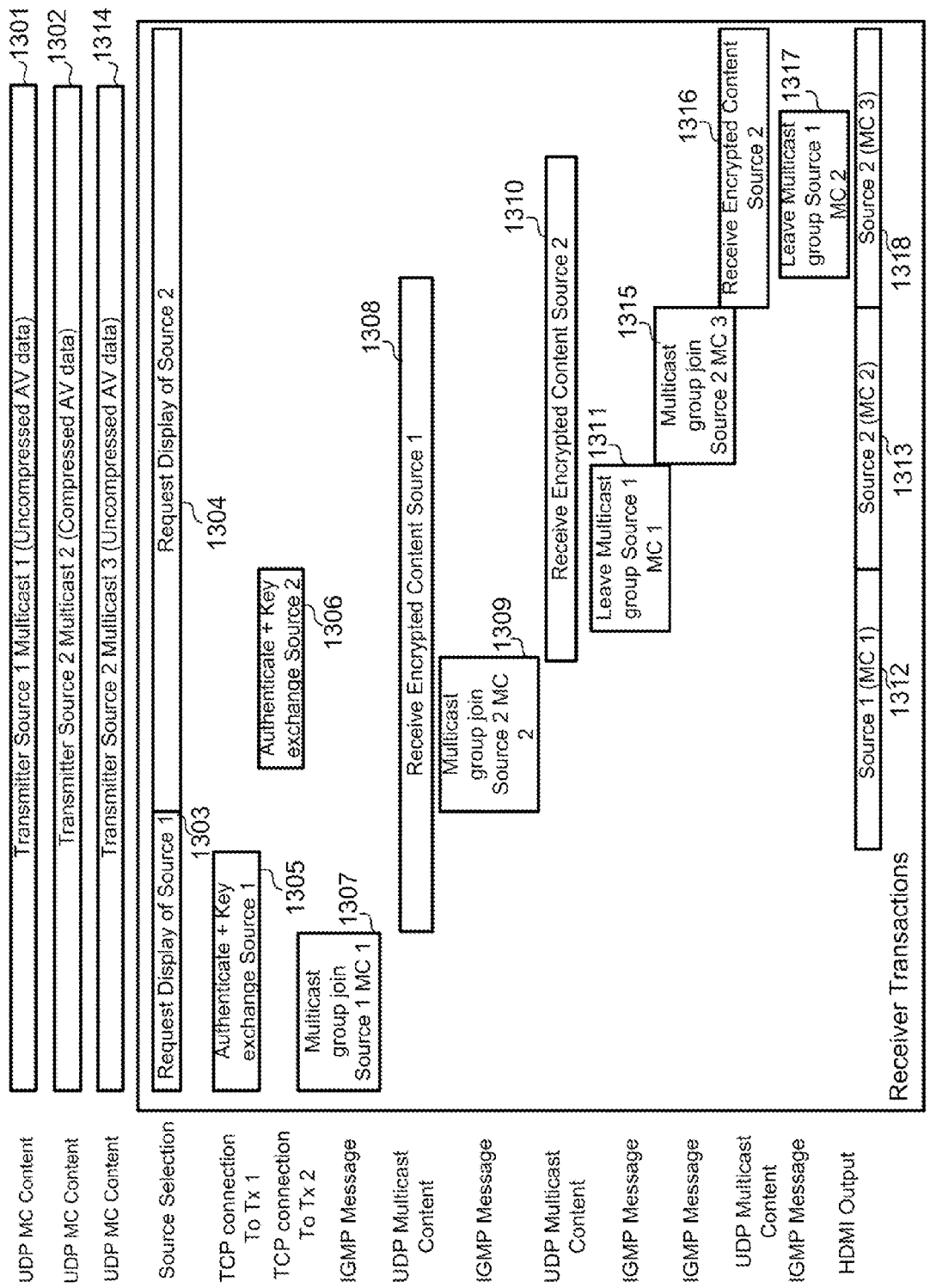

FIG. 20 is a transaction sequence illustrating receiver transactions on the AV distribution network, according to one illustrative embodiment.

Figure 21:
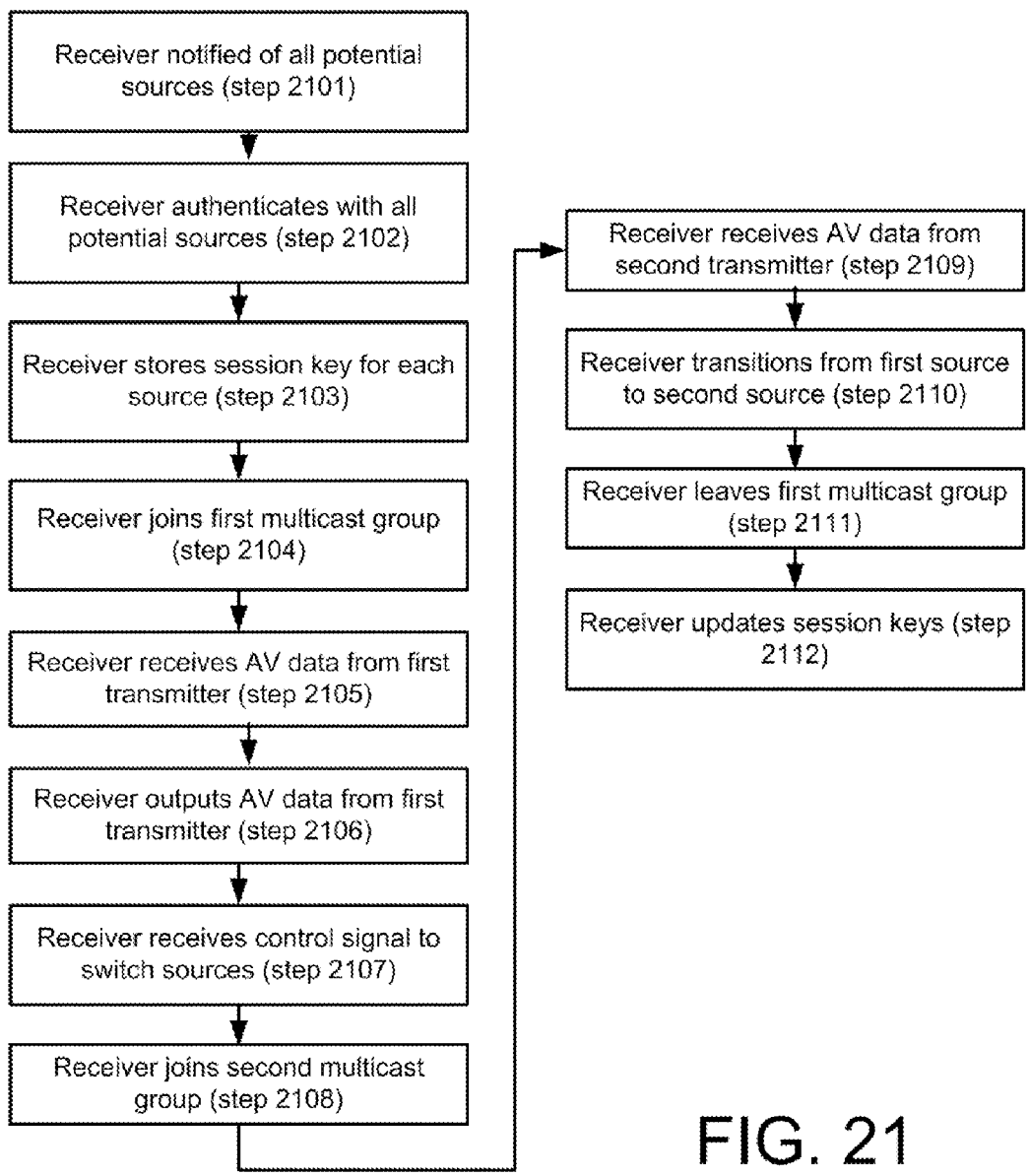

FIG. 21 is a flowchart detailing a method for switching AV sources in an AV distribution network, according to one illustrative embodiment.

Figure 22:
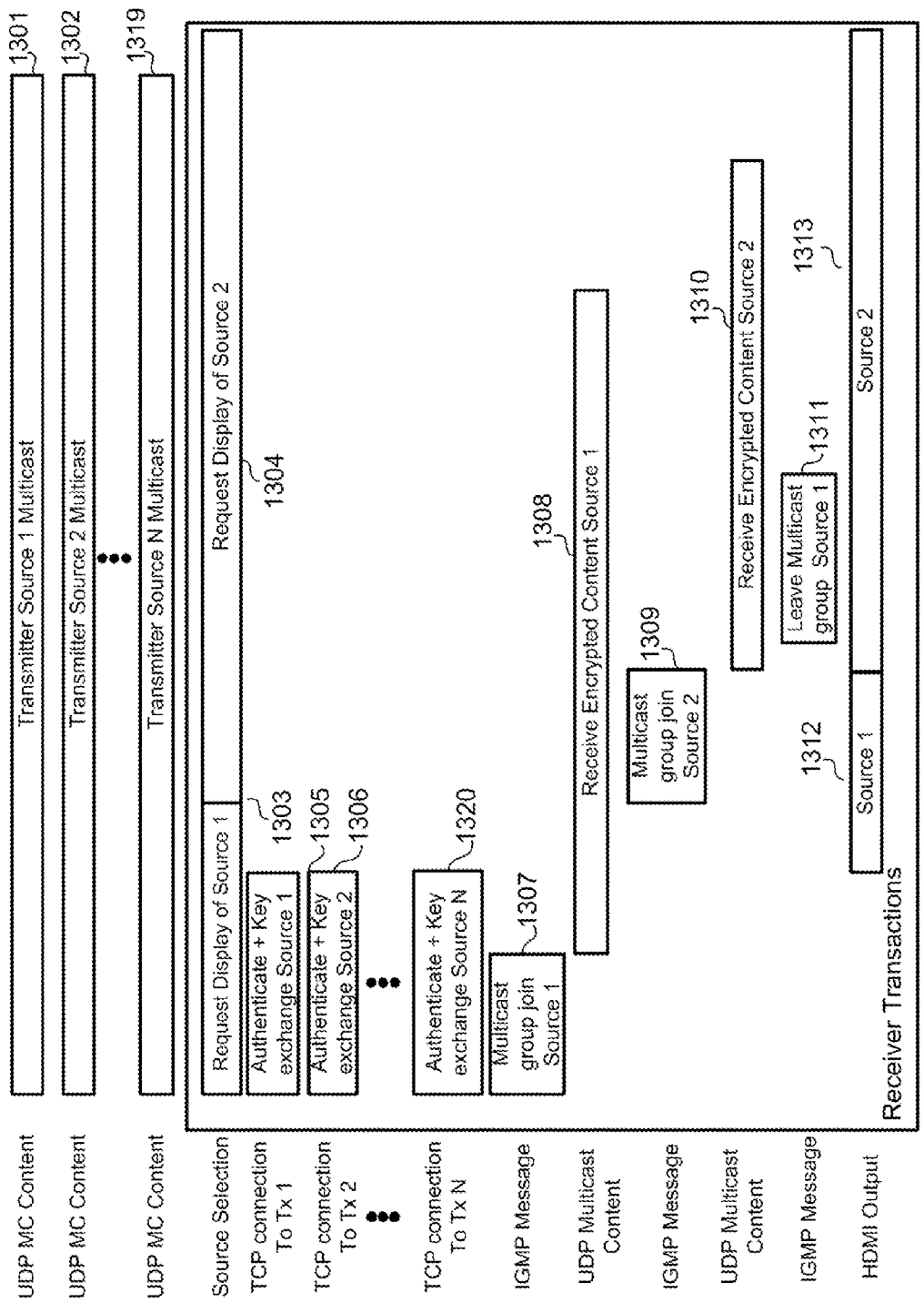

FIG. 22 is a transaction sequence illustrating receiver transactions on the AV distribution network, according to one illustrative embodiment.

Figure 23:
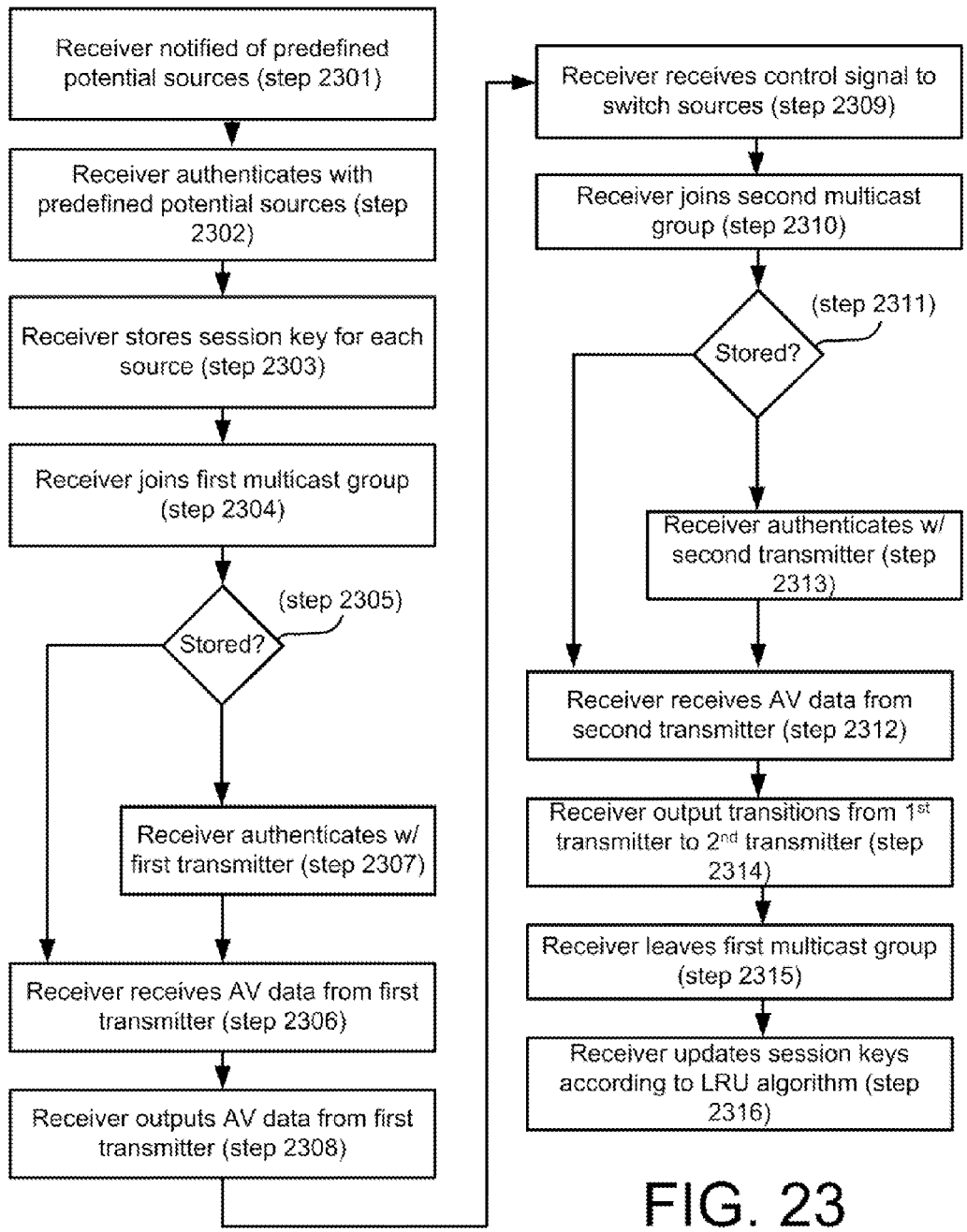

FIG. 23 is a flowchart detailing a method for switching AV sources in an AV distribution network, according to one illustrative embodiment.

LIST OF REFERENCE NUMBERS FOR THE MAJOR ELEMENTS IN THE DRAWING

The following is a list of the major elements in the drawings in numerical order.
2 local area network
10 audiovisual distribution network
11 audiovisual source (collectively the audiovisual sources of 11a . . . n)
12 transmitter (collectively the transmitters of 12a . . . n)
13 network switch (collectively the network switches of 13a . . . 13n)
14 receiver (collectively the receivers of 14a . . . n)
15 audiovisual sink (collectively the audiovisual sinks of 15a . . . n)
40 back panel
41 VGA IN
42 first HDMI OUT port
43 second HDMI IN port
44 RJ 45 LAN port
45 RS-232 port
46 USB HID port
47 USB HID port
48 IR port
49 power cable connection
110 HDCP 1.x protected interface (collectively the HDCP 1.x interfaces of 110a . . . n)
111 HDCP 2.x protected interface (collectively the HDCP 2.x interfaces of 111a . . . n)
121 HDMI transceiver
123 uncompressed packet formatter FPGA
125 central processing unit
127 memory buffer
129 ethernet PHY module
141 ethernet PHY module
143 packet decoder FPGA
145 central processing unit
147 memory buffer
149 HDMI transceiver
1101 (step of) joining first multicast group
1102 (step of) authenticating with first transmitter
1103 (step of) receiving AV data from first transmitter
1104 (step of) outputting AV data from first transmitter
1105 (step of) receiving control signal to switch source to second transmitter
1106 (step of) leaving first multicast group
1107 (step of) joining second multicast group
1108 (step of) authenticating with second transmitter
1109 (step of) receiving AV data from second transmitter
1110 (step of) outputting AV data from second transmitter
1201 HDMI transceiver
1202 VGA to HDMI converter
1203 DSP module
1204 first splitter
1205 FPGA
1206 PHY module
1207 scaler
1208 second splitter
1209 HDMI receiver
1210 SoC module
1211 10/100 mbit switch
1212 IR generator
1213 TMDS decoder
1214 data formatter and framer
1215 first-in-first-out-buffer
1216 encryption module
1217 payload assembler
1218 timestamp
1219 IP encoder (SMPTE)
1220 external SDRAM DDR3
1221 MII to Memory Mapped Interface
1222 10G Ethernet MAC
1223 serializer/deserializer
1224 10G PHY
1225 external host processor
1226 host central processing unit
1227 video data buffer
1228 moving average filter
1229 format converter
1230 second order loop filter (low pass filter)
1231 control circuit
1232 phase-locked loop circuit
1233 programmable clock generator 1234 jitter cleaner
1235 clock divider
1236 frame rate processing block
1237 frame buffer
1238 input scaling block
1239 output scaling block
1240 free running output timing generator
1301 first Internet Protocol multicast
1302 second Internet Protocol multicast
1303 first source select
1304 second source select
1305 first authentication and key exchange transaction
1306 second authentication and key exchange transaction
1307 first multicast group join transaction
1308 received first Internet Protocol multicast stream
1309 second multicast group join transaction
1310 received second Internet Protocol multicast stream
1311 first multicast group leave transaction
1312 output source 1 AV data
1313 output source 2 AV data
1314 third Internet Protocol multicast
1315 third multicast group join transaction
1316 received third Internet Protocol multicast stream
1317 second leave multicast group transaction
1318 output source 2 AV data
1319 nth Internet Protocol multicast
1320 nth authentication and key exchange transaction
1401 (step of) joining first multicast group
1402 (step of) authenticating with first transmitter
1403 (step of) receiving AV data from first transmitter
1404 (step of) outputting AV data from first transmitter
1405 (step of) receiving control signal to switch source to second transmitter
1406 (step of) joining second multicast group
1407 (step of) authenticating with second transmitter
1408 (step of) receiving AV data from second transmitter
1409 (step of) outputting AV data from second transmitter
1410 (step of) leaving first multicast group
1601 (step of) joining first multicast group
1602 (step of) authenticating with first transmitter
1603 (step of) receiving AV data from first transmitter
1604 (step of) outputting AV data from first transmitter
1605 (step of) receiving control signal to switch source to second transmitter
1606 (step of) joining second multicast group
1607 (step of) authenticating with second transmitter
1608 (step of) receiving AV data from second transmitter
1609 (step of) genlocking first transmitter AV data and second transmitter AV data
1610 (step of) executing transition effect
1611 (step of) leaving first multicast group
1701 (step of) joining first multicast group
1702 (step of) authenticating with first transmitter
1703 (step of) receiving AV data from first transmitter
1704 (step of) outputting AV data from first transmitter
1705 (step of) buffering one or more frames of AV from first transmitter
1706 (step of) receiving control signal to switch source to second transmitter
1707 (step of) leaving first multicast group
1708 (step of) joining second multicast group
1709 (step of) authenticating with second transmitter
1710 (step of) receiving AV data from the second transmitter
1711 (step of) outputting one or more buffered frames
1712 (step of) outputting second transmitter AV data
1801 (step of) joining first multicast group
1802 (step of) authenticating with first transmitter
1803 (step of) receiving AV data from first transmitter
1804 (step of) outputting AV date from first transmitter
1805 (step of) receiving control signal to switch source to second transmitter
1806 (step of) outputting repeated frame of AV data
1807 (step of) leaving first multicast group
1808 (step of) joining second multicast group
1809 (step of) authenticating with second transmitter
1810 (step of) receiving AV data from the second transmitter
1811 (step of) outputting second transmitter AV data
1901 (step of) transmitting uncompressed AV data to a first multicast group
1902 (step of) joining first multicast group
1903 (step of) authenticating with first transmitter
1904 (step of) receiving AV data from first transmitter
1905 (step of) outputting AV date from first transmitter
1906 (step of) transmitting compressed AV data to a second multicast group
1907 (step of) transmitting uncompressed AV data to a third multicast group
1908 (step of) receiving control signal to switch source to a second transmitter
1909 (step of) joining second multicast group
1910 (step of) authenticating with second transmitter
1911 (step of) receiving compressed AV data from the second transmitter
1912 (step of) transitioning from outputting AV data from first multicast group to outputting AV data from the second multicast group
1913 (step of) leaving the first multicast group
1914 (step of) joining the third multicast group
1915 (step of) receiving compressed AV data from second transmitter
1916 (step of) transitioning from outputting AV data from second multicast group to AV data from third multicast group (transition from compressed to uncompressed AV data)
1917 (step of) leaving second multicast group
2101 (step of) being notified of all potential sources
2102 (step of) authenticating with all potential sources
2103 (step of) storing session key for each source
2104 (step of) joining the first multicast group
2105 (step of) receiving AV data from the first transmitter
2106 (step of) outputting AV data from the first transmitter
2107 (step of) receiving control signal to switch sources
2108 (step of) joining the first multicast group
2109 (step of) receiving AV data from the second transmitter
2110 (step of) transitioning from outputting the AV data from the first source to outputting the AV data from the second source
2111 (step of) leaving the first multicast group
2112 (step of) updating session keys
2301 (step of) being notified of predefined number of potential sources
2302 (step of) authenticating with predefined number of potential sources
2303 (step of) storing the session key for each source
2304 (step of) joining the first multicast group
2305 (step of) determining if session key is stored
2306 (step of) receiving AV data from the first transmitter
2307 (step of) authenticating with the first transmitter
2308 (step of) outputting AV data from the first transmitter
2309 (step of) receiving control signal to switch sources
2310 (step of) joining a second multicast group 2311 (step of) determining if session key is stored
2312 (step of) receiving AV data from the second transmitter
2313 (step of) authenticating with the second transmitter
2314 (step of) transitioning from outputting the AV data from the first source to outputting the AV data from the second source
2315 (step of) leaving the first multicast group
2316 (step of) updating session keys according to a LRU algorithm

DETAILED DESCRIPTION OF THE INVENTION

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to."

MODE(S) FOR CARRYING OUT THE INVENTION

The present invention is directed to an audiovisual (AV) distribution network communicating via Internet Protocol and implemented as a framework of local area networks (LANs). Transmitters and receivers in the AV distribution network leverage multicast transmission technology and compression standards to switch seamlessly between sources transmitting audiovisual data that may be content protected by a security protocol scheme.

While the present embodiment is described as being deployed in a framework of LANs but it is not necessarily limited thereto. Similarly, while the AV distribution network is described is as employing a variety of formats, protocols and standards, the formats, protocols and standards are for illustrative purposes only and are not limiting. For example, while the high-bandwidth digital content protection (HDCP) 1.x and 2.x and the h.264 compression standard are described in the specification, the AV distribution network is not limited to a particular security protocol or a particular compression standard. Persons skilled in the art will appreciate that one or more elements of the described embodiments can be interchanged and/or combined.

FIG. 1 is an AV distribution network, in accordance with an illustrative embodiment. The audiovisual distribution network 10 comprises one or more AV sources 11 (hereinafter also referred to as AV sources or video sources), one or more intermediate transceiver devices functioning as audiovisual transmitters 12 (hereinafter also referred to as transmitters, video transmitters, transmitter devices, intermediate transmitters or the like), a network switch 13, one or more intermediate transceiver devices functioning as AV receivers 14 (hereinafter also referred to as receivers, video receivers, receiver devices, intermediate receivers or the like) and one or more AV sinks 15 (hereinafter also referred to as a video sink, sink or the like).

The AV distribution network 10 distributes AV data from one or more AV sources 11 to one or more AV sinks 15 via one or more network switches 13 and networked intermediate transceiver devices functioning as transmitters 12, receivers 14 or both. Each AV source 11 transmits AV data to an intermediate transceiver device functioning as a transmitter 12. The transmitter 12 relays the AV data to one or more intermediate transceiver devices functioning as a receiver 14. Each of the one or more receivers 14 then transmits the AV data to an AV sink 15.

The AV sources 11 may be Blu-Ray Disc® Players, media servers, digital video disc (DVD) players, digital video recorders (DVR), and cable boxes or any device other device capable of transmitting audiovisual data.

The AV sources 11 are configured for transmitting audiovisual data to an intermediate transceiver device over an audiovisual interface. The audiovisual data may be transmitted as an industry standard signal. For example, the audiovisual data may be transmitted via a High-Definitional Multimedia Interface (HDMI) interface. The HDMI specification defines an interface for carrying digital audiovisual data. Throughout this specification, the AV source 11 will be described as transmitting digital audiovisual data over an HDMI interface. However, the audiovisual interface may be any other interface for transmitting video such as a Video Graphics Array (VGA) interface, a Digital Video Interface (DVI) interface or a Display Port (DP) interface.

The audiovisual interface may serve as a protected interface, thereby allowing the video source to transmit audiovisual data protected under a security protocol to the intermediate transceiver device. Various content protection schemes have been developed for a variety of reasons. For example, certain content protection schemes are employed to ensure that a user may not intercept transmissions of television shows, movies and music.

One content protection scheme to protect digital content that is transmitted over cables between devices is known as High-Bandwidth Digital Content Protection (HDCP). HDCP is a specified method administered by Digital Content Protection, L.L.C. (DCP) for protecting digital content as it travels across connection interfaces and protocols such as DP, DVI and HDMI. Other security protocols for content encryption include Secure Real-Time Transfer Protocol (SRTP), Secure Sockets Layer (SSL) and Transport Layer Security (TLS).

A commonly implemented form is HDCP 1.x (e.g. ver. 1.4). Traditionally, HDCP 1.x is used to communicate content from point to point. In other words, a transmitter 12 may only send content to a single sink 15. The use of intermediate transceiver devices, known as repeaters, is permitted; however, it requires further decrypting and re-encrypting as well as additional security steps. Revisions of the HDCP scheme (HDCP 2.x) implement an interface independent scheme thereby allowing a device to transmit protected content to multiple sinks 15.

In the embodiment shown in FIG. 1, the audiovisual distribution network 10 is an HDCP protected network and accordingly, one or more of the video sinks 15 may receive HDCP protected content from one or more of the AV sources 11. Additionally, a transmitter 12 may distribute HDCP content to more than one receiver 14 simultaneously as provided in HDCP 2.x. The interfaces between each HDCP source and sink 15 must be HDCP protected interfaces. As such, whether functioning as a transmitter 12 or receiver 14, each intermediate transceiver device must decrypt the HDCP content at the HDCP receiver on each of its inputs and re-encrypt the data with an HDCP transmitter on each of its outputs. The intermediate transceiver device must inform the upstream device of its downstream connections and it is the responsibility of the intermediate transceiver device to maintain the HDCP protection of those connections.

FIG. 2 is a block diagram of the AV distribution network, in accordance with an illustrative embodiment. The AV sources 11 are communicatively coupled to the transmitters 12 over a security protocol protected link, such as an HDCP 1.x protected HDMI interface 110. The transmitters 12 are communicatively coupled to the receivers 14 over a security protocol protected link, such as an HDCP 2.x protected interface 111 comprising a plurality of copper or fiber LAN interfaces such as a Category-5 (Cat-5) interface and one or more network switches 13. Receivers 14 are communicatively coupled to AV sinks 15 over a security protocol protected link such as via an HDCP 1.x protected HDMI interface 110.

HDCP 2.x comprises two functions: authentication of receiving devices and encryption of audiovisual data.

Before a device can receive a session key necessary to decrypt audiovisual data encrypted by the HDCP transmitter, it must pass a multistep process. Included in the process are four steps: Authentication and key exchange; locality check; authentication with repeaters; and session key exchange.

The authentication and key exchange step involves the verification of the HDCP receiver's public key certificate. During this step, a master key ($k_m$) is communicated from the receiver 14 to the transmitter 12.

The locality check allows the transmitter 12 to verify that the receiver 14 is located in the vicinity of the transmitter 12. To verify that the receiver 14 is in the same vicinity as the transmitter 12, the transmitter 12 performs a Round Trip Time test which checks to see that the delay between a pair of messages is not more than 7 milliseconds (ms).

The authentication with repeaters step is employed if the receiver 14 is a repeater. This step involves the communication of the downstream topology from repeaters in the path to the transmitter 12.

The session key exchange step is performed after the authentication checks and locality check are complete. The session key is exchanged and is employed by the transmitter 12 and receiver 14 to encrypt and decrypt the audiovisual data.

Unlike HDCP 1.x, which is a point-to-point link, HDCP 2.x allows for multiple receivers 14 to decode the same content using the same encryption key. To transmit the same content to multiple receivers 14 on an IP network, there are three forms of IP communication: unicast, multicast and broadcast. Unicast communications provide a route for sending datagrams from one end-point to another end-point. Multicast communications provide routes for datagrams to be sent from at least one end-point to a pre-designated group of end-points. In broadcast communications an end-point sends the same datagrams to all connected end-points.

Common unicast applications are hypertext transfer protocol (HTTP) and file transfer protocol (FTP). Unicast is the most common of the three IP communications and the only one of the three that employs the transmission control protocol (TCP). A transmitter 12 may transmit multiple copies of audiovisual data using unicast message over TCP or UDP. However, as the number of receivers 14 increase, the amount of data the transmitter 12 needs to send is increased as well.

A transmitter 12 may transmit multiple copies of the audiovisual data via a broadcast stream. Broadcasts force all devices on the network segment to receive the traffic. While this ensures that each device on a network receives a communication, this also wastes bandwidth. Broadcasting to devices that are not involved with the broadcasted content burdens those devices and results in wasted network bandwidth.

Multicast is an optimization of where the data is only sent to a subset of devices using a special set of addresses. Internet Group Management Protocol (IGMP) is employed to manage these groups. Network switches 13 implement IGMP snooping to reduce network traffic on segments with no devices in the group.

Accordingly, transmitters 12 may transmit HDCP 2.x encrypted content to multiple receivers 14 via an Internet Protocol multicast stream. This reduces both the bandwidth on the network as well as the processing burden on devices.

The AV source 11 transmits AV data to the transmitter 12 over an AV interface such as an HDMI interface. The AV data may be compressed or uncompressed and the AV interface may be a security protocol interface such as an HDCP 1.x protected interface.

FIG. 3 is a simplified block diagram of a transmitter device 12, in accordance with an illustrative embodiment. The intermediate transceiver devices are dual-function devices functioning as a transmitter 12, a receiver 14 or both simultaneously depending on where they are deployed in the network topology. FIG. 7 is a block diagram of the intermediate transceiver device in further detail, according to one embodiment.

It should be understood that the block diagrams of FIGS. 3, 5, 6-11 are for illustrative purposes only. As such, components and functions in these block diagrams may overlap and components. For example, the external clock generator 1233 of FIG. 10 may perform substantially the same function and be embodied in the same device as the free running output timing generator 1240 of FIG. 11. Particularly, in implementations wherein the transmitter and receiver are embodied in a single transceiver device.

While the transmitters 12 and receivers 14 are described throughout this specification as being implementations of an intermediate transceiver device, the transmitters 12 and receivers 14 need not be implementations of a dual-function device, such as the intermediate transceiver. While the multi-functional aspect of the intermediate transceiver device provides benefits such as versatility, the transmitter 12 and receiver 14 may each be single function devices dedicated to either transmitting or receiving and comprising the elements described herein for each.

In an embodiment, the intermediate transceiver device is an endpoint in the AV distribution network 10. The endpoint is a device that allows conversion of audio and video from one medium to another.

When functioning as a transmitter 12, the intermediate transceiver devices are configured for receiving audiovisual data from an AV source 11 over an industry standard interface such as an HDMI interface. As described above, the transmitter 12 may receive HDCP protected content from the AV source 11 over an HDCP protected interface.

The transmitter 12 is further configured for unencrypting the HDCP protected content and re-encrypting for transmission over an Internet Protocol based network. The transmitter 12 is configured for simultaneously transmitting the audiovisual data in both a compressed format and an uncompressed format. In an embodiment, the transmitter 12 compresses the audiovisual content according to the h.264 video compression format or the MPEG-4 Part 10 Advanced Video Coding (AVC) video compression format.

The transmitter device 12 comprises an HDMI transceiver 121, an uncompressed packet formatter field programmable gate array (FPGA) 123, a central processing unit (CPU) 125, a memory buffer 127 and an Ethernet PHY module 129.

The transmitter device 12 receives the encrypted audiovisual content (HDCP 1.x or 2.x) over the HDCP protected interface such as an HDMI interface. The HDMI transceiver 121 removes the HDCP encryption from the audiovisual data by decrypting the AV data. The front end processing of the transmitter device 12 will be described in further detail below in relation to FIGS. 7 and 8.

The unencrypted audiovisual content is then routed to the uncompressed packet formatter FPGA 123. The uncompressed packet formatter FPGA 123 conditions the transition minimized differential signal (TMDS) signal comprising the audiovisual content to a format which can be encrypted using HDCP 2.x. The conditioned audiovisual data is routed to an IP encoder, such as an SMPTE-2022-5/6 encoder, and on to an Ethernet 10 gigabit (GB) Media Access Controller (MAC) using multicast UDP messages. The audiovisual data then exits the uncompressed packet formatter FPGA 123 and is routed to an Ethernet PHY module 129, such as a 10 GB phy or fiber module. The CPU 145 implements the low bandwidth authentication, locality check and key exchange portion of HDCP. The front end processing and encapsulation functions of the transmitter 12 will be described in further detail below in relation to FIGS. 7, 8 and 9.

FIG. 4 shows the back panel 40 of the intermediate transceiver device, in accordance with one embodiment. In this embodiment, the intermediate transceiver device is a stand-alone device. The intermediate transceiver device comprises a VGA IN port 41 functioning as an input port, a first HDMI port 43 functioning as an input port, a second HDMI port 42 functioning as an output port, two RJ45 LAN ports 44, an RS 232 port 45, a first USB HID port 46, a second USB HID port 47, an IR port 48 and a power cable connection 49.

A local area network (LAN) 2 distributes the audiovisual data. The LAN may employ a network switch 13 such as a 10 GB Ethernet switch. The network switch 13 is configured for routing the audiovisual data from intermediate transmitter 12 to intermediate receiver 14. The network switch 13 comprises 10 GB links with some number of up-links for cascading.

In addition to distributing the audiovisual content from intermediate audiovisual transmitters 12 to intermediate audiovisual receivers 14, the network switch 13 is further configured for communicating information between the intermediate AV transmitters 12 and intermediate AV receivers 14. For example, the network switch 13 may facilitate communication necessary for HDCP authentication between devices, may transmit control and status information, EDID information from a video sink 15 to an AV source 11 as well as other information.

To facilitate multicast communication on the network, the network switch 13 implements a multicast group management protocol. In an embodiment, the network switch 13 implements Internet Group Management Protocol (IGMP) snooping. IGMP is a communications protocol used by hosts and adjacent routers on IP networks to establish multicast group membership.

In another embodiment, the network implements multicast listener discovery (MLD) to manage multicast groups. While the network is described throughout this specification as implementing IGMP, this is for illustrative purposes only and the multicast group management protocol is not limited thereto.

While the audiovisual distribution network 10 in FIG. 1 shows a single network switch 13, the audiovisual distribution network 10 is not limited to an audiovisual distribution network 10 with a single switch. FIG. 5 shows an audiovisual distribution network 10 comprising multiple network switches 13, in accordance with one illustrative embodiment.

The AV distribution network 10 of FIG. 5 comprises a first network and a second network. The first network comprises one or more AV sources 11, one or more AV sinks 15, a first network switch 13a and one or more intermediate transceiver devices functioning as transmitters 12 and receivers 14. The second network comprises one or more AV sources 11, one or more AV sinks 15, a second network switch 13b and one or more intermediate transceiver devices functioning as transmitters 12 and receivers 14. The first network and second network are connected via a network link between the first network switch 13a and the second network switch 13b. There may be more than one network switch 13a between the first network and second network. Accordingly, AV data transmitted from an AV source 11 in the first network may be routed to an AV sink 15 in the second network via both the first network switch 13a and the second network switch 13b.

FIG. 6 is a block diagram of an intermediate transceiver device functioning as a receiver 14, in accordance with one illustrative embodiment. The intermediate transceiver devices may be dual-function devices functioning as a transmitter 12 or receiver 14 or both simultaneously depending on where they are employed in the network topology. Components and functions in this FIG. 5, as well as FIGS. 6-11 may overlap across FIGS.

Essentially, the receiver 14 reverses the process of the transmitter 12 with the added function of recovering the pixel clock signal. The intermediate receiver 14 is configured for receiving compressed or uncompressed audiovisual data from a transmitter 12 over an IP based network link. For example, the receiver 14 may receive a multicast UDP message via an Ethernet PHY interface. As described above, the receiver 14 may receive HDCP protected content from the intermediate transmitter device 12 via an HDCP protected interface.

The receiver 14 is further configured for unencrypting the HDCP protected content and re-encrypting for transmission over an AV interface such as an HDMI interface.

The receiver 14 device comprises an Ethernet phy module 141, an packet decoder field programmable gate array (FPGA) 143, a central processing unit (CPU) 145, a memory buffer 147 and an AV transceiver 149, such as an HDMI transceiver.

The receiver 14 device receives the encrypted audiovisual content (HDCP 2.x) over the HDCP protected network link as a UDP multicast. The transmitter device 12 employs an HDCP receiver to remove the HDCP encryption. The unencrypted audiovisual content is then routed to the FPGA 143. The FPGA 143 conditions the transition minimized differential signal (TMDS) signal to an HDMI format. The signal comprising the audiovisual content then exits the FPGA 143 and is routed to an HDMI transmitter 149. The CPU 145 implements the low bandwidth authentication, locality check and key exchange portion of HDCP.

FIG. 7 is a block diagram of an intermediate transceiver device for use in an audiovisual distribution network 10, in accordance with one illustrative embodiment. The block diagram of FIG. 7 shows elements of the intermediate transmitter device 12 as well as signal types transmitted to and from these elements.

The intermediate transceiver device comprises an HDMI transceiver/switch 1201. The HDMI transceiver 1201 is configured for receiving an HDCP protected HDMI signal from a video source. The AV data on the HDMI signal may be encrypted or unencrypted. If the AV data is encrypted, the HDMI interface 1201 removes HDCP protection by decrypting the AV data using the session key received when authenticating with the source of the AV data. In an embodiment, the HDMI transceiver/switch 1201 is an ADV7625

5x2 HDMI Transceiver switch available from Analog Devices, Inc. of Norwood Mass. or similar transceiver/switch.

The intermediate transceiver device also comprises a VGA to HDMI converter 1202 such as an ADV7850 available from Analog Devices or similar converter. The VGA to HDMI converter 1202 converts a VGA signal from an AV source 11 to a TDMS signal which is then routed to the HDMI transceiver/switch 1201.

The intermediate transceiver device further comprises a digital signal processing (DSP) module 1203 in communication with the HDMI transceiver switch 1201. In an embodiment, the DSP module 1203 is a DSP module available from Cirrus Logic of Austin, Tex. The DSP module 1203 is configured for audio down mixing. In certain applications, user desire to down mix audio in a surround sound format to stereo audio. The DSP module 1203 receives surround sound audio from the HDMI transceiver as a plurality of I2S streams and returns a single I2S stream.

The intermediate transceiver device further comprises a first splitter 1204, such as a 1:2 splitter as shown in FIG. 7. In an embodiment, the first splitter 1204 may be an EP9142 1:2 Splitter available from Explore Microelectronics of Taiwan. The 1:2 splitter 1204 receives a transition minimized differential signal (TMDS) comprising AV data without HDCP encryption from the HDMI transceiver 1201 and transmits a TMDS signal to both an FPGA 1205 and a scaler 1207.

The FPGA 1205 conditions the transition minimized differential signal (TMDS) signal comprising the audiovisual content to a format which can be encrypted using HDCP 2.x. The condition audiovisual data is routed to an IP encoder 1219, such as an SMPTE-2022-5/6 encoder and on to an Ethernet 10 gigabit (GB) Media Access Controller (MAC) using multicast UDP messages.

The FPGA 1205 is in communication with a PHY module 1206 such as an Ethernet PHY module or small form-factor pluggable transceiver (SFP+). The PHY module interfaces to the network switch 13 and the audiovisual distribution network 10.

The scaler 1207 is configured for downscaling the TMDS signal for h.264 encoding. The scaler 1207 is further configured for scaling the TMDS signal to a native resolution of the corresponding AV sink 15, such as when functioning as a receiver 14. Advantageously, by scaling the TMDS to a native resolution of the AV sink 15, the scaler 1207 eliminates downstream processing of the AV data. In one embodiment, the receiver 14 may receive the native signal of the corresponding AV sink 15 as EDID information.

The scaler 1207 is further configured for scaling one or more received Internet Protocol multicast streams to a common resolution. As will be described later, this is a necessary step to generator locking (i.e. genlocking) the AV data from more than one internet protocol multicast stream.

In an embodiment of the invention, the scaler 1207 is configured for maintaining an authenticated connection with the AV sink 15. The scaler 1207 is configured for generating video timing data during switching events. Advantageously, by generating video timing data, the receiver 14 may maintain an HDCP authenticated interface with the video sink 15 thereby reducing switching times.

FIG. 11 is a block diagram illustrating operations of the scaler 1207, in accordance with one illustrative embodiment. In an embodiment of the invention, the scaler is configured for generating image content data. For example, the scaler may generate a repeated frame of image content data, such as a repeated frame of video, during switching discontinuities. Advantageously, the AV sink 15 receiving the image content data may present an aesthetically pleasing switch in embodiments in which make-before-break transitions cannot be made.

The scaler 1207 comprises a frame rate processing block 1236, a memory further comprising a frame buffer 1237, an input scaling block 1238 and an output scaling block 1239. In this embodiment, the term block is synonymous with circuit.

The scaler 1207 receives input audiovisual data video timing data and image content data. The frame rate processing block 1236 is configured for receiving the asynchronous input video timing data and writing the incoming image content data into memory 1237. The frame rate processing block 1236 is further configured for receiving the free-running output video timing data and reading incoming video data from memory as required by the output resolution of the scaler 1207 (i.e. native resolution of the AV sink). The frame rate processing block 1236 is further configured for performing frame rate conversion if the input refresh rate and the output refresh rate of the audiovisual data differ.

The input scaling block 1238 is configured for receiving the asynchronous input video timing data and performing scaling if required. In certain applications depending on the input and output setups, it is advantageous to perform input scaling before frame rate processing. In alternate applications it is advantageous to perform output scaling subsequent to frame rate processing. In these applications, the output scaling block 1239 receives the free running output video timing data and performs scaling if required.

In an embodiment, the scaler 1207 comprises a free running output timing generator 1240 that is configured for continuously generating a free running output video timing data used to give the downstream video sink a fixed resolution.

In embodiments in which the scaler 1207 generates audiovisual data comprising a repeated frame of image content data, the last frame of video received by the scaler 1207 (i.e. the frame to be repeated) is repeatedly read from the memory and frame buffer 1237 and output by the scaler 1207. Upon the scaler 1207 achieving scaler lock with audiovisual data from the second source, a frame of image content data from audiovisual data received from the second source is read from the memory and frame buffer 1237 and output by the scaler 1207.

The scaler outputs the scaled TMDS signal to a second splitter 1208, such as the 1:2 splitter shown in FIG. 7. In an embodiment, the first splitter may be an EP9142 1:2 Splitter available from Explore Microelectronics of Taiwan. The second splitter 1208 splits the output of the scaler to both the HDMI transceiver 1201 and HDMI receiver 1209. The routed output to the HDMI transceiver is output to an AV sink 15 from the HDMI transceiver 1201, such as AV data being transmitted from a receiver 14 at the native resolution to an AV sink 15.

The HDMI receiver 1209 transmits a transistor transistor logic (TTL) signal to a system on chip (SoC) module 1210. For example, the SoC module 1210 may be an ARM SoC. The SoC module 1210 further comprises an encoder, such as h.264 encoder and a decoder, such as an h.264 decoder. In other embodiments, the encoder may be an h.265 encoder and h.265 decoder, a JPEG2000 encoder and decoder or an MJPEG encoder and decoder. The h.264 encoder is configured for compressing AV data according to the h.264 video compression standard for transmission on the AV distribution network 10. The h.264 decoder is configured for decoding AV data compressed according to the h.264 video compression standard. The h.264 decoder may be employed to decode compressed AV data for transmission on an AV interface to an HDMI sink 15 such as an HDMI interface.

In an embodiment, the encoding and decoding functions are performed by the FPGA.

The SoC module 1210 is further configured for compressing audio data using MP3, AAC and other mechanisms.

The SoC module 1210 is in communication with a 10/100 mbit switch 1211. The 10/100 mbit switch 1211 is in communication with both a 10/100 mbit courtesy port and the FPGA 1205 outputting to the network switch 13.

The SoC module 1210 further communicates with an infrared generator 1212 via a USB signal. The SoC module 1210 is configured for generating RS232 signals.

FIG. 8 is a block diagram illustrating the front end processing function of the intermediate transceiver device, in accordance with one illustrative embodiment. The FPGA of the intermediate transceiver device conditions the transition minimized differential signal (TMDS) signal comprising the audiovisual content to a format which can be encrypted using HDCP 2.x. The front end processing provides a seamless interface for the FPGA to the HDMI transceiver. The front end processing further provides TMDS clock alignment, TMDS character detection, TMDS deskewing, TMDS decoding to separate image content data signals, auxiliary data and video timing data signals (i.e. synchronization clocks)

The HDMI transceiver 1201 receives AV data over an HDMI interface. The AV data may be encrypted or unencrypted. If the AV data is encrypted, the HDMI interface 1201 removes HDCP protection by decrypting the AV data using the session key received when authenticating with the source of the AV data.

The unencrypted AV data is transmitted from the HDMI transmitter 1201 via a TMDS signal to the FPGA. The FPGA comprises a TMDS decoder 1213 which receives the TDMS signal and decodes and outputs separate image content data signals (RGB), video timing data (i.e. synchronization), control signal, auxiliary data signal and video clock to a data formatter and framer module 1214.

The data formatter and framer module 1214 further comprises a first-in-first-out (FIFO) buffer 1215. The data formatter and framer module is configured for tagging various data types and packing the data into 128 bit words. The FIFO buffer 1215 (or alternatively a dual port RAM) is configured for crossing clock domain prior to AES encryption. The output of the FIFO buffer 1215 is transmitted via an Advanced eXtensible Interface (AXI) bus to an encryption module 1216.

The encryption module 1216 is configured for implementing the two components of HDCP authentication: HDCP key exchange and AES-128 encryption. In the embodiment shown in FIG. 8, the encryption module 1216 employs advanced encryption standard (AES) encryption in 128 CTR mode.

FIG. 9 is a block diagram illustrating the encapsulation function of the intermediate transceiver device, in accordance with one illustrative embodiment. The FPGA receives the encrypted AV data from the front end processing block and encodes the data for transmission on the AV distribution network 10. The encrypted AV data is received at a payload assembler 1217 and then routed to an IP encoder 1219, such as an SMPTE-2022-5/6 encoder and on to an Ethernet 10 gigabit (GB) Media Access Controller (MAC) 1222 using multicast UDP messages.

The payload assembler 1217 is configured for receiving the uncompressed AES encrypted AV data as well as unencrypted TMDS info frames and assemble the data into 64 bit words for presentation to the IP encoder 1219, such as the SMPTE-2022 IP encapsulation engine. The payload assembler 1217 further inserts an additional payload header at predetermined intervals. The additional payload header comprises video standard information such as image dimensions, frame rate and pixel clock. This information will be required at the receiver 14.

The payload assembler 1217 is further configured for inserting a timestamp. The timestamp is generated by a timestamp module 1218 and is generated on the pixel clock. In an embodiment, the timestamp is used by the receiver 14 in a clock recovery algorithm.

As will be described later in reference to FIG. 19 and FIG. 20, in an embodiment, the timestamp of the payload header is employed to transition from a compressed version of AV data to an uncompressed version. The timestamp is utilized by the receiver 14 to synchronize a compressed version of AV data with an uncompressed version of AV data. By synchronizing the two streams according to matching time stamps, the receiver 14 may output a seamless transition between the two streams. In this embodiment, the FPGA receives both an AES encrypted signal comprising compressed AV data and an AES encrypted signal comprising uncompressed AV data and processes both for transmission on the AV distribution network 10.

The payload assembler 1217 outputs to the SMPTE 2022-5/6 encoder 1219 via a 64 bit AXI bus for IP encapsulation and forward error correction. For example, the SMPTE-2022-5/6 encoder 1219 is a 10G SMPTE-2022-5/6 encoder 1219. SMPTE-2022-5 is a standard for the transport of high bitrate media over IP networks. SMPTE-2022-6 is a standard for forward error correction for high bitrate media transport over IP networks. The SMPTE-2022-5/6 encapsulates the payload data from the payload assembler 1217 into RTP/UDP/IP packets and optionally generates and transmits forward error correction packets. The encoder 1219 is scalable to multiple channels allowing the transmitter 12 to transmit more than one channel of audiovisual data and additional non-AV data.

While the IP encoder 1219 is shown as an SMPTE-2022-5/6 encoder and described herein as an SMPTE-2022-5/6 encoder, the IP encoder 1219 is not limited to an SMPTE-2022-5/6 encoder 1219. In other embodiments, the IP encoder 1219 may encapsulate the packets according to the Real-time Transport Protocol (RTP) or MPEG-2 Transport Stream (TS) protocol.

The SMPTE 2022-5/6 1219 encoder is communicatively coupled to an external random access memory 1220, such as an external synchronous dynamic random access memory (SDRAM) double data rate three (DDR3).

The SMPTE-2022-5/6 encoder 1219 is further configured for queuing generic Ethernet traffic for transmission and for receiving generic Ethernet packets from the 10G link. The SMPTE 2022-5/6 encoder 1219 communicates with a Media Independent Interface (MII) to Memory Mapped Interface 1221 module to provide a path from the host processor or local Ethernet switch to the 10G link. The MII to Memory Mapped Interface 1221 transmits and receives Ethernet traffic via a courtesy port.

The SMPTE 2022-5/6 encoder 1219 outputs to a 10G Media Access Controller 1222 via a 64 bit AXI bus. The 10G Media Access Controller 1222 further comprises a Serializer/Deserializer (SERDES) 1223.

The FPGA further comprises a host CPU interface 1226 in communication with an external host processor 1225. For example, the external host processor 1225 may be a processor in the STM32 family available from STMicroelectronics of Geneva, Switzerland.

FIG. 10 is a block diagram illustrating the clock recovery function of the intermediate transceiver device, in accordance with one illustrative embodiment. When functioning as a receiver 14, the received video stream is created by reversing the encapsulation and encryption process (i.e. de-encapsulation and decryption of the received Ethernet frames).

A video data buffer 1227, such as a 16 line video data buffer 1227, matches the received video data rate with the recovered pixel clock rate.

A moving average filter 1228 averages the buffer level over a number of samples and feeds the average to a format converter 1229. In an embodiment, the moving average filter 1228 averages the buffer level over ten samples.

The format converter 1229 maps the buffer level to a control signal.

The mapped signal is sent to a second order loop filter 1230. In an embodiment, the second order loop filter 1230 has a cutoff frequency of 1.25 MHz.

The filtered signal is sent to a control circuit 1231 to create the phase-locked loop (PLL) 1232 pull signals.

An external programmable clock generator 1233 is employed to create a reference clock for the received video resolution.

This reference clock is fed to the Phase-locked loop circuit 1232 and pulled to the required pixel clock frequency. This range makes allowance for the frequency error of the clock generator and original pixel clock on the 10G transmission end.

In an embodiment, the recovered clock is transmitted off of the FPGA to a jitter cleaner 1234. The cleaned and recovered clock is then transmitted back to the FPGA to drive the HDMI transmitter pixel clock. The recovered clock is also transmitted to a divider 1235 to enable the line buffer read and close the recovery timing loop. The clock divider 1235 matches the received video frame rate.

In an embodiment, the audiovisual network administrators may configure the network such as through a dedicated software tool stored locally or accessed via a web interface. The network administrator may access the configuration tool via a personal computer, laptop computer, tablet, mobile phone or any other portable electronic device. In an embodiment, the virtual switch appliance is designed to emulate matrix switch control, thereby allowing for familiarity with the matrix switch paradigm.

The configuration tool may provide an introspective look into digital video distribution systems. From advanced source and display information, to source-select functions and system topology views, the configuration tool is a resource for deploying and troubleshooting audiovisual distribution networks.

The configuration tool may show a graphical representation of the hardware that is connected. In an embodiment, inputs are shown on the left, and outputs on the right. Intermediate transceiver devices are connected via colored lines with text stating resolution, connection and HDCP status. Functions or greater signal detail may be displayed by simply hovering over different parts of the system.

The configuration tool may provide one or more interfaces to reorder inputs and outputs in the audiovisual distribution network 10. In one embodiment, the configuration tool provides a graphic user interface providing the ability to drag-and-drop. The configuration tool may also provide an interface geared toward experienced users based on a grid which allows for minimal keystrokes.

In an embodiment, the audiovisual distribution network 10 implements a method for automatically visualizing the network topology. The network switch may then mine this information from Address Resolution Protocol (ARP) tables and provide it to the configuration tool for visual display.

Each intermediate transceiver device may include a drop-down box used for selecting the input to be routed. This quick-route tool aids in testing sources during system commissioning. Setup buttons on each transmitter and receiver 14 device brings you to additional menus that are organized in a convenient tabbed format. Transmitter menus provide EDID setup, HDCP testing, test signal generation and other advanced features; receiver 14 menus provide a means to adjust cable type and enable Deep Color support. Transmitters also have their own setup screens allowing adjustments to incoming source signals. Receivers 14 views present resolution, cable length, HDCP and routing data.

Via the configuration tool user interface, technicians can quickly identify signal behaviors and take action to remedy unwanted results.

Extended Display Identification Data (EDID) is a crucial part of digital AV signals—and in an embodiment, the configuration tool provides the ability to view, manage or manually edit EDID. In addition to video resolution, refresh rate, and format information, the configuration tool supplies audio information including number of channels, resolution, and format.

Other configuration tool features allow EDID copying from a display so that it can be applied to a set group of sources. An advanced button for Deep Color exposes compatible resolutions that work within the Deep Color guidelines. Audio selections for "Best Common" automatically selects the audio format that is compatible with all selected displays while "Best Overall" give integrators the choice of audio format regardless of downstream device support.

The virtual server appliance will further include simple network management protocol and may interface with the Crestron Fusion® building management software available from Crestron Electronics, Inc. of Rockleigh, N.J.

In an embodiment, transmitters 12 and receivers 14 leverage one-to-many protocols such as multicast transmission. Multicast is an optimization of one-to-many communication protocols where data is only transmitted to a subset of devices on the AV distribution network 10 using a special set of addresses. Internet Group Management Protocol (IGMP) is typically employed on a network to manage these subsets of devices. Network switches 13 implement IGMP snooping which may be used to reduce network traffic on network segments with no devices in the group. In an embodiment, the network implements MLD to manage the multicast groups.

In a multicast transmission scheme, a subset of receivers 14 subscribes to and authenticate with a transmitter 12. The transmitter 12 then transmits content protected AV data to this subset of receivers 14 which have subscribed and authenticated with the transmitter 12. By joining and leaving different multicast groups, the receiver 14 effectively switches AV sources 11.

FIG. 12 is a flowchart detailing a method for switching AV sources 11 in an AV distribution network, according to an illustrative embodiment. FIG. 13 is a transaction sequence illustrating receiver transactions on the AV distribution network, according to one illustrative embodiment.

The transaction sequences of FIG. 13, FIG. 15, FIG. 18, FIG. 20, and FIG. 22 show information transacted during the associated method described in that FIGURE with time being the horizontal or x-axis.

UDP multicast content refers to audiovisual data that is being transmitted by the accompanying transmitter 12.

Source selection refers to the source which is currently selected. It does not refer to the source that is actually being output by the transmitter 12. For example, upon a source switch from source 1 to source 2 being requested, the source will switch from "Request Display of Source 1" to "Request Display of Source 2".

TCP connection refers to one or more network connections or out-of-band connections established to authenticate with a source.

IGMP message refers to messages transmitted by a receiver 14 to join or leave a multicast group.

UDP multicast content refers to the received IP multicast stream at the receiver 14.

HDMI output refers to the output AV data of the receiver 14.

In step 1101, a receiver 14 joins a first multicast group corresponding to a first transmitter 12a. The receiver 14 initiates the join by sending an IGMP message to the network switch 13 to request joining the multicast group. The network switch 13 in turn routes multicast datagrams containing that multicast group address to the receiver 14.

In step 1102, the receiver 14 authenticates with the first transmitter 12a according to a security protocol. The receiver 14 initiates the authentication process by establishing a TCP connection with the transmitter 12. The receiver 14 and the transmitter 12 then start the authentication process according to HDCP specification, such as the HDCP 2.x specification. Once the authentication process is complete, the receiver 14 receives the session key for the encrypted AV data from the first transmitter 12a. The session key is received in a secure manner.

In another embodiment, the receiver 14 may authenticate with the first transmitter 12a by establishing an alternative network connection such as a UDP connection. In another embodiment, the receiver 14 authenticates with the transmitter 12 by establishing an out-of-band connection.

In step 1103, upon authenticating with the first transmitter 12a, the receiver 14 begins receiving AV data from the first transmitter 12a. The first transmitter 12a transmits encrypted AV data as a multicast datagram to the AV distribution network 10. The network switch 13 routes the multicast datagram to all subscribers of the multicast including the receiver 14.

In step 1104, the receiver 14 outputs the AV data from the first AV source 11 to an AV sink 15. The receiver 14 decrypts the encrypted AV data using the session key received from the transmitter 12a. The receiver 14 scales the AV data to a common resolution. In an embodiment, this is the preferred resolution, or native resolution, of the video sink 15 as determined via EDID information received for the AV sink 15. The receiver 14 then re-encrypts the data using the session key for the HDCP link with the AV sink 15, such as an HDMI interface and then transmits the re-encrypted data to the AV sink 15, such as over an HDMI interface.

In step 1105, the receiver 14 receives a control signal to switch sources to a second transmitter 12b. The control signal may be received via a data channel of the AV interface to the AV sink 15. For example, in an embodiment, the receiver 14 receives a control signal to switch to a second transmitter 12b over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In another embodiment, the transmitter 12 may receive the control signal from the user device, such as a remote control or personal electronic device, directly. For example, the transmitter 12 may be an AV endpoint in communication with a network control point such as a touch panel device, a personal electronic device such as a mobile phone or a tablet computer.

In another embodiment, the transmitter 12 may automatically switch sources in response to another action or setting. For example, in an embodiment, the receiver 14 may switch sources upon a new source being connected. The receiver 14 may automatically switch to the most recently plugged in source.

In step 1106, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14.

In step 1107, the receiver 14 joins a second multicast group corresponding to a second transmitter 12b. The receiver 14 initiates the join by sending an IGMP message to the network switch 13 to request joining the multicast group. The network switch 13 in turn routes multicast datagrams containing that multicast group address to the receiver 14 by employing IGMP snooping.

In step 1108, the receiver 14 authenticates with the second transmitter 12b according to a security protocol. The receiver 14 initiates the authentication process by establishing a TCP connection with the second transmitter 12b. The receiver 14 and the second transmitter 12b then start the authentication process according to HDCP specification, such as the HDCP 2.x specification. Once the authentication process is complete, the receiver 14 receives the session key for the encrypted AV data from the second transmitter 12b.

In step 1109, upon authenticating, the receiver 14 receives data from the second transmitter 12b. The second transmitter 12b transmits encrypted AV data as a multicast datagram to the AV distribution network 10. The network switch 13 routes the multicast datagram to all subscribers of the multicast including the receiver 14.

In step 1110, the receiver 14 outputs the AV data from the second AV source 11 to the AV sink 15. The receiver 14 decrypts the encrypted AV data using the session key received from the second transmitter 12b. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

However, users desire a fast switch from the first source to the second source. While HDCP offers the benefit of encrypted content transmission, the required authentication protocol increases the switching delay in video distribution networks. Each time a new path for video distribution is desired, the links forming those paths must be authenticated. Increased switching times are disrupting and bothersome to users. In complex video distribution systems with multiple layers, this problem is even more amplified. Additionally, because HDCP scheme operates under the surface, most users do not realize that the increased time is the result of copy protection schemes and often unfairly attribute them to the individual components in the video distribution network.

An additional factor in the high switching delay in video distribution units is caused by the need for processing in video distribution networks. Scalers are employed to change the resolution or refresh rate of distributed video and are common components in video distribution networks, either as separate components or integrated into other components in the network. Each time a video scaler receives audiovisual data at a new resolution, there is a delay before the scaler outputs any new video. The video scaler must load data and format before outputting scaled video. This is known as achieving video lock. During a switching event, each scaler in the distribution path must achieve video lock in succession. In complex video distribution systems with multiple layers, this delay is amplified.

Additionally, dependent on the characteristics of the display, viewers may be subjected to disrupting video artifacts or snow during switches. Manufacturers handle disrupted video in different ways. Some displays may show snow when video is disrupted. Other may display pixilated images or ghost images. Many viewers find these display responses disturbing and lead some to believe that there is a problem with their equipment when no such problem exists. Users may experience the authentication process as a delayed period with snow or disorienting video artifacts.

Accordingly, users desire a video distribution network with reduced switching time and aesthetically pleasing switches. In an embodiment, the receiver 14 joins the second multicast group prior to leaving the first multicast group. Advantageously, the receiver 14 may then establish an authenticated interface with the second transmitter 12b and begin receiving AV data from the second transmitter 12 prior to switching sources. The receiver 14 may then execute a seamless switch.

FIG. 14 is a flowchart detailing a method for switching AV sources 11 in an AV distribution network 10, according to one illustrative embodiment. FIG. 15 is a block schematic illustrating receiver transactions on the AV distribution network 10, according to one illustrative embodiment.

In step 1401, a receiver 14 joins a first multicast group corresponding to a first transmitter 12a. The receiver 14 joins the multicast group by transmitting an IGMP message. The receiver 14 initiates the join by sending an IGMP message to the network switch 13 to request joining the multicast group. The network switch 13 in turn will begin routing multicast datagrams containing that multicast group address to the receiver 14.

In step 1402, the receiver 14 authenticates with the first transmitter 12a according to a security protocol. The receiver 14 initiates the authentication process by establishing a TCP connection with the transmitter 12. The receiver 14 and the transmitter 12 then start the authentication process according to the HDCP specification, such as the HDCP 2.x specification. Once the authentication process is complete, the receiver 14 receives the session key for the encrypted AV data from the first transmitter 12a.

In step 1403, upon authenticating with the first transmitter 12a, the receiver 14 receives AV data from the first transmitter 12a. The first transmitter 12a transmits encrypted AV data as a multicast datagram to the AV distribution network 10. The network switch 13 routes the multicast datagram to all subscribers of the multicast including the receiver 14.

In step 1404, the receiver 14 outputs the AV data from the first transmitter 12a (i.e., from the first AV source 11a) to an AV sink 15. The receiver 14 decrypts the encrypted AV data using the session key received from the transmitter 12. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 1405, the receiver 14 receives a control signal to switch sources to a second transmitter 12b. The control signal may be received via a data channel of the AV interface to the AV sink 15. For example, in an embodiment, the receiver 14 receives a control signal to switch to a second transmitter 12b over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 1406, the receiver 14 joins a second multicast group corresponding to a second transmitter 12b prior to leaving the first multicast group. The receiver 14 initiates the join by sending an IGMP message to the network switch 13 to request joining the multicast group. The network switch 13 in turn routes multicast datagrams containing that multicast group address to the receiver 14.

In step 1407, the receiver 14 authenticates with the second transmitter 12b according to a security protocol. The receiver 14 initiates the authentication process by establishing a TCP connection with the second transmitter 12b. The receiver 14 and the second transmitter 12b then start the authentication process according to HDCP specification, such as the HDCP 2.x specification. Once the authentication process is complete, the receiver 14 receives the session key for the encrypted AV data from the second transmitter 12b.

In step 1408, upon authenticating, the receiver 14 receives data from the second transmitter 12b. The second transmitter 12b transmits encrypted AV data as a multicast datagram to the AV distribution network 10. The network switch 13 routes the multicast datagram to all subscribers of the multicast including the receiver 14.

In step 1409, the receiver 14 outputs the AV data from the second transmitter 12b (i.e., the second AV source 11b) to the AV sink 15. The receiver 14 decrypts the encrypted AV data using the session key received from the second transmitter 12b. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 1410, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14.

FIG. 16 is a flowchart illustrating a method for switching sources in an audiovisual distribution network 10, according to one illustrative embodiment. In an embodiment, the receiver 14 simultaneously receives AV data from both a first transmitter 12a and a second transmitter 12b and executes a seamless switch by decoding both streams simultaneously, genlocking the two decoded streams and then executing a seamless transition effect. As an example, a seamless transition effect may include a cut, a wipe or a fade.

In step 1601, a receiver 14 joins a first multicast group corresponding to a first transmitter 12a. The receiver 14 joins the multicast group by transmitting an IGMP message. The receiver 14 initiates the join by sending an IGMP message to the network switch 13 to request joining the multicast group. The network switch 13 in turn will begin routing multicast datagrams containing that multicast group address to the receiver 14.

In step 1602, the receiver 14 authenticates with the first transmitter 12*a* according to a security protocol. The receiver 14 initiates the authentication process by establishing a TCP connection with the transmitter 12. The receiver 14 and the transmitter 12 then start the authentication process according to HDCP specification, such as the HDCP 2.x specification. Once the authentication process is complete, the receiver 14 receives the session key for the encrypted AV data from the first transmitter 12*a*.

In step 1603, upon authenticating with the first transmitter 12*a*, the receiver 14 receives AV data from the first transmitter 12*a*. The first transmitter 12*a* transmits encrypted AV data as a multicast datagram to the AV distribution network 10. The network switch 13 routes the multicast datagram to all subscribers of the multicast including the receiver 14. The receiver 14 decrypts the encrypted AV data using the session key received from the transmitter 12. The receiver 14 scales the AV data to the common resolution.

In step 1604, the receiver 14 outputs the AV data from the first transmitter 12*a* (i.e., the first AV source 11*a*) to an AV sink 15. The receiver 14 then re-encrypts the data using the session key for the HDCP link with the AV sink 15, such as an HDMI interface and then transmits the re-encrypted data to the AV sink 15, such as over an HDMI interface.

In step 1605, the receiver 14 receives a control signal to switch sources to a second transmitter 12*b*. The control signal may be received via a data channel of the AV interface to the AV sink 15. For example, in an embodiment, the receiver 14 receives a control signal to switch to a second transmitter 12*b* over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 1606, the receiver 14 joins a second multicast group corresponding to a second transmitter 12*b* prior to leaving the first multicast group. The receiver 14 initiates the join by sending an IGMP message to the network switch 13 to request joining the multicast group. The network switch 13 in turn routes multicast datagrams containing that multicast group address to the receiver 14.

In step 1607, the receiver 14 authenticates with the second transmitter 12*b* according to a security protocol. The receiver 14 initiates the authentication process by establishing a TCP connection with the second transmitter 12*b*. The receiver 14 and the second transmitter 12*b* then start the authentication process according to HDCP specification, such as the HDCP 2.x specification. Once the authentication process is complete, the receiver 14 receives the session key for the encrypted AV data from the second transmitter 12*b*.

In step 1608, upon authenticating, the receiver 14 receives data from the second transmitter 12*b* simultaneously with the first transmitter 12*a*. The second transmitter 12*b* transmits encrypted AV data as a multicast datagram to the AV distribution network 10. The network switch 13 routes the multicast datagram to all subscribers of the multicast including the receiver 14. The receiver 14 decrypts the encrypted AV data using the session key received from the second transmitter 12*b*.

In step 1609, the receiver 14 genlocks the AV data from the first transmitter 12*a* and the AV data from the second transmitter 12*b* if required. The receiver 14 determines whether genlocking is necessary and then genlocks the two AV streams.

In step 1610, the receiver 14 executes a transition effect and transitions from outputting AV data from the first transmitter 12*a* to outputting AV data from the second transmitter 12*b* (i.e., the second AV source 11*b*). The receiver 14 re-encrypts the AV data using the session key for the HDCP link with the AV sink 15, such as an HDMI interface and then transmits the re-encrypted data to the AV sink 15, such as over an HDMI interface.

In step 1611, the receiver 14 leaves the first multicast group and ceases receiving AV data from the first transmitter 12*a*. The receiver 14 leaves the first multicast group and ceases receiving AV data from the first transmitter 12*a*. The receiver 14 leaves the first multicast group by sending an IGMP message to the network switch 13 to leave the group. Datagrams containing the multicast address are no longer routed to the receiver 14.

FIG. 17 is a flowchart illustrating a method for switching sources in an AV distribution network 10, in accordance with an illustrative embodiment. In certain applications, a network segment may not support simultaneous transmission of two uncompressed AV streams. For example, there may be insufficient bandwidth to carry both uncompressed streams on a network segment. This would prevent a receiver 14 from doing a make before break transition of displaying the new content prior to leaving the first multicast group. In an embodiment, the receiver 14 may buffer video data from the first AV stream to display while transitioning to outputting the second AV stream.

In step 1701, a receiver 14 joins a first multicast group corresponding to a first transmitter 12*a*. The receiver 14 initiates the join by sending an IGMP message to the network switch 13 to request joining the multicast group. The network switch 13 in turn routes multicast datagrams containing that multicast group address to the receiver 14.

In step 1702, the receiver 14 authenticates with the first transmitter 12*a* according to a security protocol. The receiver 14 initiates the authentication process by establishing a TCP connection with the transmitter 12*a*. The receiver 14 and the transmitter 12*a* then start the authentication process according to HDCP specification, such as the HDCP 2.x specification. Once the authentication process is complete, the receiver 14 receives the session key for the encrypted AV data from the first transmitter 12*a*.

In step 1703, upon authenticating with the first transmitter 12*a*, the receiver 14 receives AV data from the first transmitter 12*a*. The first transmitter 12*a* transmits encrypted AV data as a multicast datagram to the AV distribution network 10. The network switch 13 routes the multicast datagram to all subscribers of the multicast including the receiver 14.

In step 1704, the receiver 14 outputs the AV data from the first transmitter 12*a* (i.e., the first AV source 11*a*) to an AV sink 15. The receiver 14 decrypts the encrypted AV data using the session key received from the transmitter 12*a*. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 1705, the receiver 14 buffers one or more frames of AV data from the first multicast AV stream. The receiver 14 may buffer the one or more frames of AV data in a frame buffer. In an embodiment, the frame buffer 1237 is a component of the scaler 1207.

In step 1706, the receiver 14 receives a control signal to switch sources to a second transmitter 12b. The control signal may be received via a data channel of the AV interface to the AV sink 15. For example, in an embodiment, the receiver 14 receives a control signal to switch to a second transmitter 12b over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 1707, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14.

In step 1708, the receiver 14 joins a second multicast group corresponding to a second transmitter 12b. The receiver 14 initiates the join by sending an IGMP message to the network switch 13 to request joining the multicast group. The network switch 13 in turn routes multicast datagrams containing that multicast group address to the receiver 14.

In step 1709, the receiver 14 authenticates with the second transmitter 12b according to a security protocol. The receiver 14 initiates the authentication process by establishing a TCP connection with the second transmitter 12b. The receiver 14 and the second transmitter 12b then start the authentication process according to HDCP specification, such as the HDCP 2.x specification. Once the authentication process is complete, the receiver 14 receives the session key for the encrypted AV data from the second transmitter 12b.

In step 1710, upon authenticating, the receiver 14 receives data from the second transmitter 12b. The second transmitter 12b transmits encrypted AV data as a multicast datagram to the AV distribution network 10. The network switch 13 routes the multicast datagram to all subscribers of the multicast including the receiver 14.

In step 1711, the receiver 14 outputs the one or more buffered frames of AV data. While the receiver 14 is leaving the first multicast group, joining the second multicast group and receiving the AV data from the second transmitter 12b, the receiver 14 may output the buffered frames of video from the first transmitter 12a, thereby reducing any discontinuity of outputting AV data from the receiver 14.

In step 1712, the receiver 14 outputs the AV data from the second transmitter 12b (i.e., the second AV source 11b) to the AV sink 15. The receiver 14 decrypts the encrypted AV data using the session key received from the second transmitter 12b. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

FIG. 18 is a flowchart illustrating a method for switching sources in an AV distribution network 10, in accordance with an illustrative embodiment. In this embodiment, the receiver 14 may "freeze" a frame of the first AV stream on the display while transitioning to outputting the second AV stream.

In step 1801, a receiver 14 joins a first multicast group corresponding to a first transmitter 12a. The receiver 14 initiates the join by sending an IGMP message to the network switch 13 to request joining the multicast group. The network switch 13 in turn routes multicast datagrams containing that multicast group address to the receiver 14.

In step 1802, the receiver 14 authenticates with the first transmitter 12a according to a security protocol. The receiver 14 initiates the authentication process by establishing a TCP connection with the transmitter 12a. The receiver 14 and the transmitter 12a then start the authentication process according to HDCP specification, such as the HDCP 2.x specification. Once the authentication process is complete, the receiver 14 receives the session key for the encrypted AV data from the first transmitter 12a.

In step 1803, upon authenticating with the first transmitter 12a, the receiver 14 receives AV data from the first transmitter 12a. The first transmitter 12a transmits encrypted AV data as a multicast datagram to the AV distribution network 10. The network switch 13 routes the multicast datagram to all subscribers of the multicast including the receiver 14.

In step 1804, the receiver 14 outputs the AV data from the first transmitter 12a (i.e., the first AV source 11a) to an AV sink 15. The receiver 14 decrypts the encrypted AV data using the session key received from the transmitter 12a. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 1805, receiver 14 receives a control signal to switch sources to a second transmitter 12b. The control signal may be received via a data channel of the AV interface to the AV sink 15. For example, in an embodiment, the receiver 14 receives a control signal to switch to a second transmitter 12b over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 1806, the receiver 14 outputs a repeated frame of generated image content data. Essentially, by outputting a repeating frame, the display on the AV sink 15 looks "frozen" on the last frame, thereby presenting an aesthetically pleasing transition. In response to the control signal, the receiver 14 ceases outputting received AV data from the first transmitter 12a and instead generates a repeating frame of image content data and video timing data. For example, the repeated frame of video content data may be the last frame of video data received from the first transmitter 12a. The receiver 14 may utilize a scaler comprising a frame buffer and a memory buffer to generate and output the repeated frame of image content data.

In step 1807, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14.

In step 1808, the receiver 14 joins a second multicast group corresponding to a second transmitter 12b. The receiver 14 initiates the join by sending an IGMP message to the network switch 13 to request joining the multicast group. The network switch 13 in turn routes multicast datagrams containing that multicast group address to the receiver 14.

In step 1809, the receiver 14 authenticates with the second transmitter 12b according to a security protocol. The receiver 14 initiates the authentication process by establishing a TCP connection with the second transmitter 12b. The receiver 14 and the second transmitter 12b then start the authentication process according to HDCP specification, such as the HDCP 2.x specification. Once the authentication process is complete, the receiver 14 receives the session key for the encrypted AV data from the second transmitter 12*b*.

In step 1810, upon authenticating, the receiver 14 receives data from the second transmitter 12*b*. The second transmitter 12*b* transmits encrypted AV data as a multicast datagram to the AV distribution network 10. The network switch 13 routes the multicast datagram to all subscribers of the multicast including the receiver 14.

In step 1811, the receiver 14 outputs the AV data from the second transmitter 12*b* (i.e., the second AV source 11*b*) to the AV sink 15. The receiver 14 decrypts the encrypted AV data using the session key received from the second transmitter 12*b*. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

The receiver 14 must receive a sufficient amount of audiovisual data from the second transmitter 12*b* prior to outputting live audiovisual data from the second transmitter 12*b*. This is known as achieving video lock. Following a switching discontinuity, the scaler is further configured to generate the video timing data and repeated frame of image content data until video lock with the second transmitter 12*b* is achieved. Upon achieving video lock with the incoming video after the switching discontinuity, the receiver 14 will then "unfreeze" the video by ceasing outputting the repeating frame and instead outputting the live scaled video. By repeating a frame of video, the user is presented a cleaner and more aesthetically pleasing switch consisting of a momentarily, and in some instances imperceptible, frozen screen.

In addition to the aesthetic advantages and perceived reduction in switching time by the user, the current invention reduces the switching time by maintaining scaler lock in any downstream scalars such as scalars embedded in video sinks 15. In HDCP systems switching time is further minimized. By outputting a continuous stream of audiovisual data, more specifically video timing data, to the HDCP transmitter, the HDCP link between the receiver 14 and the AV sink 15 is maintained as authenticated during the switch.

FIG. 19 is a flowchart detailing a method for switching AV sources 11 in an AV distribution network 10, according to one illustrative embodiment. FIG. 20 is a block schematic illustrating receiver 14 transactions on the AV distribution network 10, according to one illustrative embodiment.

In another embodiment in which a network segment may not support two uncompressed AV streams, the transmitter 12 is configured for multicasting both a compressed format version and an uncompressed format version of the AV data. For example, the transmitter 12 may transmit both a multicast datagram of the AV data and the compressed version of the data using a compression technology such as the H.264 Advanced Video Coding Standard, MPEG-4 or any other protocol for compressing AV data.

The AV data is received at the transmitter 12 by the HDMI transceiver. The AV data is then split at the first splitter. One path is routed to the scaler for downscaling and then to the h.264 encoder for compression. Both paths are then routed into the FPGA and encoded as two channels at the IP encoder. As described above, the IP encoder may be an SMPTE 2022 encoder. However, the IP encoder is not limited to an SMPTE encoder. The IP encoder may encode the AV data according to the Real Time Transport (RTP) protocol or the MPEG-2 TS protocol. The compressed and uncompressed multicast streams are transmitted as two channels on the network segment.

To conserve bandwidth on the network, IP based video distribution may implements data compression of the AV data prior to transmission as less data utilizes less bandwidth. Compression is accomplished by representing a relatively larger group of data bits with a smaller group of data bits. When compressed video data is received, it is decompressed to expand it back to approximately its original format for display. Examples of compressed video formats include: mpeg2, h.264, h.265 and JPEG2000.

Current uncompressed video standards may require transmission at a bit rate in excess of 5 Gbit/s approximately. For example, certain video formats at 4K resolution, also known as Ultra High Definition require large amounts of bandwidth. Commonly used compression standards may reduce that bit rate of approximately 10 Mbps.

In step 1901, a first transmitter 12*a* transmits uncompressed AV data from a first AV source 11*a* as a multicast datagram to a first multicast group.

In step 1902, a receiver 14 joins the first multicast group corresponding. The receiver 14 initiates the join by sending an IGMP message to the network switch 13 to request joining the multicast group. The network switch 13 in turn routes multicast datagrams containing that multicast group address to the receiver 14.

In step 1903, the receiver 14 authenticates with the first transmitter 12*a* according to a security protocol. The receiver 14 initiates the authentication process by establishing a TCP connection with the first transmitter 12*a*. The receiver 14 and the first transmitter 12*a* then start the authentication process according to HDCP specification, such as the HDCP 2.x specification. Once the authentication process is complete, the receiver 14 receives the session key for the encrypted AV data from the first transmitter 12*a*.

In step 1904, upon authenticating with the first transmitter 12*a*, the receiver 14 receives the uncompressed AV data from the first transmitter 12*a*. The first transmitter 12*a* transmits encrypted uncompressed AV data as a multicast datagram to the AV distribution network 10. The network switch 13 routes the multicast datagram to all subscribers of the first multicast including the receiver 14.

In step 1905, the receiver 14 outputs the AV data from the first transmitter 12*a* (i.e., the first AV source 11*a*) to an AV sink 15. The receiver 14 decrypts the encrypted AV data using the session key received from the transmitter 12. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 1906, a second transmitter 12*b* transmits a compressed version of AV data from a second AV source 11*b* as a multicast datagram to a second multicast group.

In step 1907, the second transmitter 12*b* simultaneously transmits an uncompressed version of the AV data from the second AV source 11*b* as a multicast datagram to a third multicast group.

In step 1908, the receiver 14 receives a control signal to switch sources to a second transmitter 12*b*. The control signal may be received via a data channel of the AV interface to the AV sink 15. For example, in an embodiment, the receiver 14 receives a control signal to switch to a second transmitter 12*b* over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 1909, the receiver 14 joins the second multicast group to receive the compressed version of AV data from the second transmitter 12b. The receiver 14 initiates the join by sending an IGMP message to the network switch 13 to request joining the second multicast group. The network switch 13 in turn routes multicast datagrams containing that multicast group address to the receiver 14.

In step 1910, the receiver 14 authenticates with the second transmitter 12b according to a security protocol. The receiver 14 initiates the authentication process by establishing a TCP connection with the second transmitter 12b. The receiver 14 and the second transmitter 12b then start the authentication process according to HDCP specification, such as the HDCP 2.x specification. Once the authentication process is complete, the receiver 14 receives the session key for the encrypted AV data from the second transmitter 12b.

In step 1911, upon authenticating with the second transmitter 12b, the receiver 14 receives the compressed version of AV data from the second transmitter 12b. The second transmitter 12b transmits encrypted AV data as a multicast datagram to the AV distribution network 10. The network switch 13 routes the multicast datagram to all subscribers of the multicast including the receiver 14.

In step 1912, the receiver 14 transitions from outputting the AV data from the first multicast group to outputting the AV data from the second multicast group to the AV sink 15. The receiver 14 decrypts the encrypted AV data using the session key received from the transmitter 12. The receiver 14 further decompresses the AV data using according to the compression standard used to decompress. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 1913, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14. By leaving the first multicast group, the receiver 14 frees up bandwidth on its network segment thereby allowing it to receive another stream of uncompressed AV data.

In step 1914, the receiver 14 joins the third multicast group to receive the uncompressed version of AV data from the second transmitter 12b. The receiver 14 initiates the join by sending an IGMP message to the network switch 13 to request joining the multicast group. The network switch 13 in turn routes multicast datagrams containing that multicast group address to the receiver 14.

In step 1915, the receiver 14 receives the uncompressed version of AV data from the second transmitter 12b. The second transmitter 12b transmits uncompressed encrypted AV data as a multicast datagram to the AV distribution network 10. The network switch 13 routes the multicast datagram to all subscribers of the multicast including the receiver 14.

In step 1916, the receiver 14 transitions from transmitting the compressed version of the AV data to the uncompressed version of the AV data. In an embodiment, time synchronization using timestamps within content are used to make aligned transitions between compressed and uncompressed content streams.

Advantageously, as both SMPTE and compressed streams utilize the RTP protocol, the same timestamps may be used to switch between the compressed and uncompressed AV data.

A memory buffer can be used to store frames of one of the multicast streams to delay the video. Alternatively, there may be a switch at a vertical interval to the uncompressed.

In step 1917, the receiver 14 leaves the second multicast group and ceases receiving the compressed AV data from the second transmitter 12b. The receiver 14 leaves the second multicast group by sending an IGMP message to the network switch 13 to leave the group. Datagrams containing the multicast address are no longer routed to the receiver 14. By leaving the second multicast group, the receiver 14 frees up bandwidth to join an additional multicast group transmitting compressed data. For example, the receiver 14 may join an additional multicast group in response to or in anticipation of a source switch.

FIG. 21 is a flowchart detailing a method for switching AV sources 11 in an AV distribution network 10, according to one illustrative embodiment. FIG. 22 is a block schematic illustrating receiver 14 transactions on the AV distribution network 10, according to one illustrative embodiment.

In another embodiment, the receiver 14 is notified of all potential sources to which it may be switched. It then establishes a connection to all transmitters 12 via TCP to authenticate with all of these sources. The receiver 14 can then receive and store the session key $K_s$ for each source to use when that content is selected. Changes in the transmitters session key $K_s$ and receivers topology that occur at run time are updated as required using the dedicated receiver-transmitter TCP connections. By pre-authenticating with transmitters 12, a significant amount of time can be saved during switching transitions.

In step 2101, receiver 14 is notified of all potential sources to which it may be routed. In an embodiment, upon system setup all transmitter devices 12 are discovered by the receiver 14. The receiver 14 may implement a network discovery tool such as Universal Plug and Play (uPnP) or Bonjour. Additionally, the receiver 14 may receive the network topology via one or more network devices such as the network switch or the network transmitters themselves. The receiver then compiles a list of potential receivers by network address.

In another embodiment, the receiver 14 is notified of potential sources by the configuration tool. For example, a user may select a receiver 14 on a graphic user interface of the virtual switch appliance and select corresponding transmitters 12 to which the receiver 14 may be routed. In another embodiment, a user may send a control signal to the receiver 14 either directly or via a video sink 15.

In step 2102, the receiver 14 authenticates with all potential transmitters 12 of which it was notified according to a security protocol. The receiver 14 initiates the authentication process by establishing a TCP connection with each transmitter 12. The receiver 14 and each transmitter 12 then start the authentication process according to HDCP specification, such as the HDCP 2.x specification. Once the authentication process is complete, the receiver 14 receives a session key from each potential transmitter 12.

In step 2103, receiver 14 stores each of the session keys in a cache.

In step 2104, a receiver 14 joins a first multicast group corresponding to a first transmitter 12a. The receiver 14 joins the multicast group by transmitting an IGMP message. The receiver 14 initiates the join by sending an IGMP message to the network switch 13 to request joining the multicast group. The network switch 13 in turn will begin routing multicast datagrams containing that multicast group address to the receiver 14.

The receiver 14 may automatically join the first multicast group on startup or may receive a control signal to switch to the first multicast group. In an embodiment, upon startup the receiver 14 automatically joins the multicast group of the last transmitter 12 from which it was subscribed.

In step 2105, the receiver 14 receives AV data from the first transmitter 12a. The first transmitter 12a transmits encrypted AV data as a multicast datagram to the AV distribution network 10. The network switch 13 routes the multicast datagram to all subscribers of the multicast including the receiver 14.

In step 2106, the receiver 14 outputs the AV data from the first transmitter 12a (i.e., the first AV source 11a) to an AV sink 15. The receiver 14 decrypts the encrypted AV data by accessing the stored session key received from the transmitter 12a. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 2107, receiver 14 receives a control signal to switch sources to a second transmitter 12b. The control signal may be received via a data channel of the AV interface to the AV sink 15. For example, in an embodiment, the receiver 14 receives a control signal to switch to a second transmitter 12b over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 2108, the receiver 14 joins a second multicast group corresponding to a second transmitter 12b prior to leaving the first multicast group. The receiver 14 initiates the join by sending an IGMP message to the network switch 13 to request joining the multicast group. The network switch 13 in turn routes multicast datagrams containing that multicast group address to the receiver 14.

In step 2109, the receiver 14 receives AV data from the second transmitter 12b. The second transmitter 12b transmits encrypted AV data as a multicast datagram to the AV distribution network 10. The network switch 13 routes the multicast datagram to all subscribers of the multicast including the receiver 14.

In step 2110, the receiver 14 transitions from transmitting AV data from the first AV source 11 to transmitting AV data from the second AV source 11 to the AV sink 15. The receiver 14 decrypts the encrypted AV data accessing the stored session key received from the second transmitter 12b. The receiver 14 then re-encrypts the data using the session key for the HDCP link with the AV sink 15, such as an HDMI interface and then transmits the re-encrypted data to the AV sink 15, such as over an HDMI interface.

In step 2111, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14.

In step 2112, receiver 14 updates session keys in cache as necessary. For example, the receiver may periodically run a network discovery tool to determine topology changes in the network. The receiver may also be notified of new transmitters on the network by management protocols in the network switch or from the transmitter itself via plug and play protocols. The receiver may then establish a network connection with these new transmitters to authenticate and receive a session key for storage in cache.

In the embodiment described above, the receiver 14 may make seamless transitions such as by buffering frames, freezing frames or executing transition effects as described above. Additionally, the network may take into account bandwidth limitations by utilizing both a compressed and uncompressed version of AV data as described above.

FIG. 23 is a flowchart detailing a method for switching AV sources 11 in an AV distribution network 10, according to one illustrative embodiment.

A hybrid of authenticating with the next source and all sources are algorithms that let a receiver 14 maintain authentication with a limited number of transmitters 12. An example of this is Least Recently Used (LRU) method. A receiver 14 can maintain a cache of some number of transmitter keys and can break the connection with transmitters 12 it has not used in some time. Receivers 14 tend to use particular sources frequently and some on occasion. Frequently used sources will switch quickly and less frequently used sources will take longer while utilizing the "next source" authentication approach described above.

In step 2301, the receiver 14 determines a predefined number of potential sources from which the receiver 14 is likely to receive AV data. The predefined number may be based on a limit in capability of the receiver 14 such as processing or memory limitations. Alternatively, the predefined number may be based on limitations set by the security protocol. In an embodiment, the receiver 14 determines the predefined number of potential sources based on a Least Recently Used (LRU) algorithm.

In step 2302, the receiver 14 authenticates with the predefined number of potential transmitters 12 of which it was notified according to a security protocol. The receiver 14 initiates the authentication process by establishing a TCP connection with each transmitter 12. The receiver 14 and each transmitter 12 then start the authentication process according to HDCP specification, such as the HDCP 2.x specification. Once the authentication process is complete, the receiver 14 receives a session key from each potential transmitter 12.

In step 2303, receiver 14 stores each of the session keys received from the predefined number of potential sources as a cache of session keys.

In step 2304, the receiver 14 joins a first multicast group corresponding to a first transmitter 12a. The receiver 14 joins the multicast group by transmitting an IGMP message. The receiver 14 initiates the join by sending an IGMP message to the network switch 13 to request joining the multicast group. The network switch 13 in turn will begin routing multicast datagrams containing that multicast group address to the receiver 14.

In step 2305, the receiver 14 determines if a session key of the first transmitter 12a is stored in the cache.

If the session key for the first transmitter 12a is stored in the cache of keys, in step 2306, the receiver 14 receives AV data from the first transmitter 12a. The first transmitter 12a transmits encrypted AV data as a multicast datagram to the AV distribution network 10. The network switch 13 routes the multicast datagram to all subscribers of the multicast including the receiver 14.

If the session key for the first transmitter 12a is not stored in the cache of keys, in step 2307, the receiver 14 authenticates with the first transmitter 12a according to the security protocol.

In step 2308, the receiver 14 outputs the AV data from the first transmitter 12a (i.e., the first AV source 11a) to an AV sink 15. The receiver 14 decrypts the encrypted AV data by accessing either the stored session key received from the transmitter 12a or the received session key from the first transmitter 12a. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 2309, the receiver 14 receives a control signal to switch sources to a second transmitter 12b. The control signal may be received via a data channel of the AV interface to the AV sink 15. For example, in an embodiment, the receiver 14 receives a control signal to switch to a second transmitter 12b over a consumer electronics control (CEC) channel of the HDMI interface. A user may enter a command to the AV sink 15 to switch sources, such as through a remote control interface or personal electronic device, and the AV sink 15 may relay this command to the transmitter 12 via the CEC channel of the HDMI interface.

In step 2310, the receiver 14 joins a second multicast group corresponding to a second transmitter 12b. The receiver 14 joins the multicast group by transmitting an IGMP message. The receiver 14 initiates the join by sending an IGMP message to the network switch 13 to request joining the multicast group. The network switch 13 in turn will begin routing multicast datagrams containing that multicast group address to the receiver 14.

In step 2311, the receiver 14 determines if a session key of the second transmitter 12b is stored in the cache.

If the session key for the second transmitter 12b is stored in the cache of keys, in step 2312, the receiver 14 receives AV data from the second transmitter 12b. The second transmitter 12b transmits encrypted AV data as a multicast datagram to the AV distribution network 10. The network switch 13 routes the multicast datagram to all subscribers of the multicast including the receiver 14.

If the session key for the second transmitter 12b is not stored in the cache of keys, in step 2313, the receiver 14 authenticates with the second transmitter 12a according to the security protocol.

In step 2314, the receiver 14 transitions from outputting AV data from the first transmitter 12a to outputting AV data from the second transmitter 12b. The receiver 14 decrypts the encrypted AV data by accessing either the stored session key received from the second transmitter 12b or the received session key from the second transmitter 12b. The receiver 14 scales the AV data to the common resolution. The receiver 14 then re-encrypts the data using the session key for the HDCP link with the AV sink 15, such as an HDMI interface and then transmits the re-encrypted data to the AV sink 15, such as over an HDMI interface.

In step 2315, the receiver 14 leaves the first multicast group and ceases receiving AV data from the first transmitter 12a. The receiver 14 leaves the first multicast group by sending an IGMP message to the network switch 13 to leave the group. Datagrams containing the multicast address are no longer routed to the receiver 14.

In step 2316, receiver 14 updates session key by implementing a LRU algorithm. As described above, the LRU algorithm replaces the least recently used key with a more frequently used key. So for example, if the receiver determines that the last session key is not stored in cache, the receiver will replace the least recently used key with the last session key. In another embodiment, the least recently used session key may not be replaced if the key is a frequently used key as determined by the receiver. The receiver determines whether the least recently used key is a frequently used key by maintaining a tally of times that a session key is employed and measuring that tally against a threshold.

In the embodiment described above, the receiver 14 may make seamless transitions such as by buffering frames, freezing frames or executing transition effects as described above. Additionally, the network may take into account bandwidth limitations by utilizing both a compressed and uncompressed version of AV data as described above.

Another hybrid alternative is to use priorities. Some receiving devices designated to have high priority can force lower priority devices to relinquish their ability to decode a given stream.

In different embodiments, a priority table can be used to specify version selection priorities based on, for example, segment or overall network capability, any device's or system's load, any device's thermal temperature, overall or specific subscriber counts, network Quality of Service (QoS), the status of occupancy detected at or near the receiver 14, ambient lighting conditions at the receiver 14, etc. Utilization by the receiver 14 may include, for example, displaying on a display device(s), recording on a recording medium, passing on to other destination devices, converting into a different format(s), further compressing, decompressing, buffering, routing to a Digital Signal Processor (DSP) for processing, etc. A display device may be a projector, a monitor (e.g., a computer monitor), a flat-panel (e.g., LCD, LED, and Plasma, etc.), a television set (e.g. CRT), a HMD (Head mounted display), a HUD (Heads Up Display), an implantable or worn display (e.g., wearable contact-lens displays), a media player, a video game console display, a cellular telephone display, a mobile tablet, a smart phone, a PDA, a component that is coupled with a graphical output device, or any other suitable screen or combination thereof.

In the embodiment described above, the receiver 14 may make seamless transitions such as by buffering frames, freezing frames or executing transition effects as described above. Additionally, the network may take into account bandwidth limitations by utilizing both a compressed and uncompressed version of AV data as described above.

Alternate Embodiments

Alternate embodiments may be devised without departing from the spirit or the scope of the invention. For example, in some embodiments, implementations using HDCP 2.x are disclosed; however, any content protection mechanism using a common key can be used to decode an encrypted broadcast or multicast stream. The invention is not limited to IP networks; in some embodiments non-IP based networks may be used.

List of Acronyms Used in the Detailed Description of the Invention

The following is a list of the acronyms used in the specification in alphabetical order.

AES Advanced Encryption Standard
AKE Authenticated Key Exchange
API Application Programming Interface
ASIC Application-Specific Integrated Circuit
AVB Audio/Video Bridging
AXI Advanced eXtensible Interface
CEC Consumer Electronics Control
CSC Content Security Control DCP Digital Content Protection, L.L.C.
DSP Digital Signal Processing
FDDI Fiber Distributed Data Interface
FPGA Field-Programmable Gate Array
FIFO First-In-First-Out
FTP File transfer protocol
Gb/s Gigabits per second
HDCP High-bandwidth Digital Content Protection
HTTP Hyper-Text Transfer protocol
IEEE Institute of Electrical and Electronics Engineers
IGMP Internet Group Management Protocol
IP Internet Protocol
JPEG2000 Joint Photographic Experts Group 2000
LAN Local area network
LRU Least Recently Used
Mb/s Megabytes per second
mpeg2 Moving Picture Experts Group part 2
PHY Physical
QOS Quality of service
RAM Random access memory
ROM Read only memory
RTP Real-time Transport Protocol
SDK Software Development Kit
SFP+ Small Form-Factor Pluggable Transceiver
SKE Session Key Exchange
SMPTE Society of Motion Picture and Television Engineers
SoC System on Chip
SRTP Secure Real-time Transfer Protocol
SSL Secure Sockets Layer
TCP Transmission Control Protocol
TLS Transport Layer Security
TS Transport Stream
TMDS Transition Minimized Differential Signal
TTL Transistor Transistor Logic
UDP User Datagram Protocol
WAN Wide area network In this description, various functions and operations may be encoded and performed by a hardware processor, (e.g. a microprocessor.) Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, Software Development Kit (SDK) component, web services, or other specific application, component, program, object, module or sequence of instructions referred to as "computer programs." Invocation interfaces to these routines can be exposed to a software development community as an Application Programming Interface (API). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

What is claimed is:

1. A system for distributing audiovisual data over a local area network, the system comprising:
   a first audiovisual source configured for transmitting first audiovisual data encrypted according to a first security protocol over a first audiovisual interface;
   a second audiovisual source configured for transmitting second audiovisual data encrypted according to a second security protocol a second audiovisual interface;
   a first audiovisual transmitter in communication with the first audiovisual source and configured for:
      receiving from the first audiovisual source the first audiovisual data encrypted according to the first security protocol,
      decrypting the first audiovisual data encrypted according to the first security protocol,
      re-encrypting the first audiovisual data according to a third security protocol,
      executing a first locality check, and
      transmitting the first audiovisual data encrypted according to the third security protocol over the local area network as a first Internet Protocol multicast stream;
   a second audiovisual transmitter in communication with the second audiovisual source and configured for:
      receiving from the second audiovisual source the second audiovisual data encrypted according to the second security protocol,
      decrypting the second audiovisual data encrypted according to the second security protocol,
      re-encrypting the second audiovisual data according to a fourth security protocol,
      executing a second locality check, and
      transmitting the second audiovisual data encrypted according to the fourth security protocol over the local area network as a second Internet Protocol multicast stream;
   a network switch in communication with the first and second audiovisual transmitters and configured for receiving and transmitting the first and second Internet Protocol multicast streams over the local area network;
   an audiovisual receiver in communication with the network switch and configured for:
      authenticating with the first audiovisual transmitter according to the third security protocol,
      receiving the first Internet Protocol multicast stream from the first audiovisual transmitter through the network switch while simultaneously authenticating with the second audiovisual transmitter according to the fourth security protocol,
      decrypting the first audiovisual data encrypted according to the third security protocol,
      re-encrypting the first audiovisual data according to a fifth security protocol, and
      transmitting the first audiovisual data encrypted according to the fifth security protocol; and
   an audiovisual sink in communication with the audiovisual receiver and configured for receiving the first audiovisual data from the audiovisual receiver according to the fifth security protocol and displaying the first audiovisual data while the audiovisual receiver is authenticating with the second audiovisual transmitter according to the fourth security protocol.

2. The system of claim 1, wherein the audiovisual receiver is configured for authenticating with the second audiovisual transmitter in anticipation of switching from the first audiovisual transmitter to the second audiovisual transmitter.

3. The system of claim 1, wherein the audiovisual receiver is configured for joining the second Internet Protocol multicast stream transmitted from the second audiovisual transmitter concurrent with authenticating with the second audiovisual transmitter.

4. The system of claim 1, wherein the audiovisual receiver is configured for
   (a) joining the second Internet Protocol multicast stream transmitted from the second audiovisual transmitter; and
   (b) buffering one or more frames of the first audiovisual data of the first Internet Protocol multicast stream prior to leaving the first Internet Protocol multicast stream and joining the second Internet Protocol multicast stream.

5. The system of claim 1, wherein the audiovisual receiver is configured for
   (a) joining the second Internet Protocol multicast stream transmitted from the second audiovisual transmitter; and
   (b) generating a repeating frame of image content data prior to leaving the first Internet Protocol multicast stream and joining the second Internet Protocol multicast stream.

6. The system of claim 1, wherein the audiovisual receiver is further configured for joining the second Internet Protocol multicast stream and leaving the first Internet Protocol multicast stream;
   receiving the second Internet Protocol multicast stream from the second audiovisual transmitter;
   decrypting the second audiovisual data encrypted according to the fourth security protocol;
   re-encrypting the second audiovisual data according to the fifth security protocol; and
   transmitting the second audiovisual data encrypted according to the fifth security protocol to the audiovisual sink.

7. The system of claim 1, wherein the audiovisual receiver is configured for initiating receiving the first internet protocol multicast stream by transmitting a message to the network switch.

8. The system of claim 1, wherein the audiovisual receiver is configured for executing a network discovery mechanism to determine topology changes in the local area network.

9. The system of claim 1, the audiovisual receiver is configured for storing in a cache a session key from the first audiovisual transmitter after authentication therewith and a session key from the second audiovisual transmitter after authentication therewith.

10. The system of claim 1, wherein:
   the first audiovisual transmitter is further configured for transmitting the first audiovisual data
   encrypted according to the third security protocol in a compressed format over the local area network as the first Internet Protocol multicast stream and simultaneously transmitting the first audiovisual data encrypted according to the third security protocol in an uncompressed format over the local area network as a third Internet Protocol multicast stream;
   the second audiovisual transmitter is further configured for transmitting the second audiovisual data encrypted according to the fourth security protocol in a compressed format over the local area network as the second Internet Protocol multicast stream and simultaneously transmitting the second audiovisual data encrypted according to the fourth security protocol in an uncompressed format over the local area network as a fourth Internet Protocol multicast stream; and the audiovisual receiver is further configured for simultaneously receiving an Internet Protocol multicast stream comprising audiovisual data in an uncompressed format and an Internet Protocol multicast stream comprising audiovisual data in a compressed format.

11. The system of claim 2, wherein the audiovisual receiver is configured for authenticating with the second audiovisual transmitter in response to a control signal to switch from the first audiovisual transmitter to the second audiovisual transmitter.

12. The system of claim 3, wherein the audiovisual receiver is configured for receiving the first Internet Protocol multicast stream and the second Internet Protocol multicast stream simultaneously over the local area network.

13. The system of claim 4, wherein the audiovisual receiver is configured for outputting the one or more buffered frames of the first audiovisual data during a switching discontinuity between leaving the first Internet Protocol multicast stream and receiving the second Internet Protocol multicast stream.

14. The system of claim 5, wherein the audiovisual receiver is configured for outputting the repeating frame of image content data during a switching discontinuity between leaving the first Internet Protocol Internet Protocol multicast stream and receiving the second Internet Protocol Internet Protocol multicast stream.

15. The system of claim 8, wherein the audiovisual receiver is configured for exchanging session keys with newly discovered audiovisual transmitters.

16. A method of distributing audiovisual data over a local area network, the system comprising the steps of:

receiving, by a first audiovisual transmitter from a first audiovisual source, first audiovisual data encrypted according to a first security protocol;

decrypting, by the first audiovisual transmitter, the first audiovisual data encrypted according to the first security protocol;

re-encrypting, by the first audiovisual transmitter, the first audiovisual data according to a third security protocol;

executing, by the first audiovisual transmitter, a first locality check;

transmitting, by the first audiovisual transmitter, the first audiovisual data encrypted according to the third security protocol over the local area network as a first Internet Protocol multicast stream;

receiving, by a second audiovisual transmitter from a second audiovisual source, second audiovisual data encrypted according to a second security protocol;

decrypting, by the second audiovisual transmitter, the second audiovisual data encrypted according to the second security protocol;

re-encrypting, by the second audiovisual transmitter, the second audiovisual data according to a fourth security protocol;

executing, by the second audiovisual transmitter, a second locality check; transmitting, by the second audiovisual transmitter, the second audiovisual data encrypted according to the fourth security protocol over the local area network as a second Internet Protocol multicast stream;

authenticating, by an audiovisual receiver, with the first audiovisual transmitter according to the third security protocol;

receiving, by the audiovisual receiver, the first internet protocol multicast stream from the first audiovisual transmitter while simultaneously authenticating with the second audiovisual transmitter according to the fourth security protocol;

decrypting, by the audiovisual receiver, the first audiovisual data encrypted according to the third security protocol;

re-encrypting, by the audiovisual receiver, the first audiovisual data according to a fifth security protocol;

transmitting, by the audiovisual receiver, the first audiovisual data encrypted according to the fifth security protocol to an audiovisual sink;

joining, by the audiovisual receiver, the second Internet Protocol multicast stream and leaving the first Internet Protocol multicast stream;

receiving, by the audiovisual receiver, the second internet protocol multicast stream from the second audiovisual transmitter;

decrypting, by the audiovisual receiver, the second audiovisual data encrypted according to the fourth security protocol;

re-encrypting, by the audiovisual receiver, the second audiovisual data according to the fifth security protocol; and transmitting, by the audiovisual receiver, the second audiovisual data encrypted according to the fifth security protocol to the audiovisual sink.

17. The method of claim 16, wherein the step of authenticating with the second audiovisual transmitter is performed in anticipation of switching from the first audiovisual transmitter to the second audiovisual transmitter.

18. The method of claim 16, wherein the step of authenticating with the second audiovisual transmitter and the step of joining the second internet protocol multicast stream are initiated substantially concurrently in anticipation of switching from the first audiovisual transmitter to the second audiovisual transmitter.

19. The method of claim 16, wherein the step of receiving the second Internet Protocol multicast stream from the second audiovisual transmitter is performed before the step of leaving the first Internet Protocol multicast stream.

20. The method of claim 16, further comprising the steps of:

(a) buffering one or more frames of the first audiovisual data from the first Internet Protocol multicast stream prior to leaving the first Internet Protocol multicast stream; and (b) outputting the one or more buffered frames of the first audiovisual data during a discontinuity between leaving the first Internet Protocol multicast stream and receiving the second audiovisual data from the second Internet Protocol multicast stream.

21. The method of claim 16, further comprising the steps of:

(a) generating a repeating frame of image content data prior to leaving the first Internet Protocol multicast stream; and (b) outputting the repeated frame of image content data during a discontinuity between leaving the first Internet Protocol multicast stream and receiving the second audiovisual data from the second Internet Protocol multicast stream.

22. The method of claim 17, further comprising the step of receiving a control signal to switch from the first audiovisual transmitter to the second audiovisual transmitter.

* * * * *